(12) United States Patent
Srivastava

(10) Patent No.: US 7,434,046 B1
(45) Date of Patent: Oct. 7, 2008

(54) METHOD AND APPARATUS PROVIDING SECURE MULTICAST GROUP COMMUNICATION

(75) Inventor: Sunil K. Srivastava, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1560 days.

(21) Appl. No.: 09/728,488

(22) Filed: Nov. 30, 2000

Related U.S. Application Data

(63) Continuation-in-part of application No. 09/470,054, filed on Dec. 22, 1999, which is a continuation-in-part of application No. 09/470,334, filed on Dec. 22, 1999, which is a continuation-in-part of application No. 09/407,785, filed on Sep. 29, 1999, which is a continuation-in-part of application No. 09/408,420, filed on Sep. 29, 1999, which is a continuation-in-part of application No. 09/393,410, filed on Sep. 10, 1999, which is a continuation-in-part of application No. 09/393,411, filed on Sep. 10, 1999.

(51) Int. Cl.
*H04L 9/00* (2006.01)
*G06F 15/177* (2006.01)

(52) U.S. Cl. .................. 713/163; 713/150; 713/162; 713/168; 713/171; 380/264; 380/277; 380/283; 709/221

(58) Field of Classification Search .............. 713/163
See application file for complete search history.

(56) References Cited

U.S. PATENT DOCUMENTS 4,200,770 A    4/1980    Hellman et al.
4,531,020 A    7/1985    Wechselberger et al.

(Continued)

FOREIGN PATENT DOCUMENTS

EP    0 952 718 A2    10/1999

(Continued)

OTHER PUBLICATIONS

Newton, Harry, Newton's Telecom Dictionary, 1998, Telecom Books, 14th Edition, p. 228.*

(Continued)

*Primary Examiner*—Ayaz Sheikh
*Assistant Examiner*—Aravind K Moorthy
(74) *Attorney, Agent, or Firm*—Hickman Palermo Truong & Becker LLP

(57) ABSTRACT

An approach for establishing secure multicast communication among multiple members that participate in a multicast group is disclosed. In one feature, multiple multicast proxy service nodes (MPSNs) are defined and control when members join or leave the multicast group. The MPSNs are logically represented by a first binary tree in which each node of the first binary tree is associated with a domain of a directory service and one or more of the MPSNs. A second binary tree is created that has leaf nodes representing each member. The second binary tree is stored in a domain of the directory service with a root node that represents one or more of the MPSNs. The members can each establish multicast communication and serve as a key distribution center. When a member joins the multicast group, a new group session key is determined by replicating a branch of the second binary tree.

64 Claims, 22 Drawing Sheets

U.S. PATENT DOCUMENTS

| | | | |
|---|---|---|---|
| 4,578,531 A | 3/1986 | Everhart et al. | |
| 4,776,011 A | 10/1988 | Busby | |
| 4,881,263 A | 11/1989 | Herbison et al. | |
| 5,309,516 A | 5/1994 | Takaragi et al. | |
| 5,351,295 A | 9/1994 | Perlman et al. | |
| 5,361,256 A | 11/1994 | Doeringer et al. | |
| 5,491,750 A | 2/1996 | Bellare et al. | |
| 5,497,421 A | 3/1996 | Kaufman et al. | |
| 5,588,060 A | 12/1996 | Aziz | |
| 5,588,061 A | 12/1996 | Ganesan et al. | |
| 5,600,642 A | 2/1997 | Pauwels et al. | |
| 5,630,184 A | 5/1997 | Roper et al. | |
| 5,633,933 A | 5/1997 | Aziz | |
| 5,663,896 A | 9/1997 | Aucsmith | |
| 5,666,415 A | 9/1997 | Kaufman | |
| 5,724,425 A | 3/1998 | Chang et al. | |
| 5,748,736 A * | 5/1998 | Mittra | 713/163 |
| 5,761,305 A | 6/1998 | Vanstone et al. | |
| 5,805,578 A | 9/1998 | Stirpe et al. | |
| 5,832,229 A * | 11/1998 | Tomoda et al. | 709/227 |
| 5,841,864 A | 11/1998 | Klayman et al. | |
| 5,850,451 A | 12/1998 | Sudia | |
| 5,889,865 A | 3/1999 | Vanstone et al. | |
| 5,920,630 A | 7/1999 | Wertheimer et al. | |
| 5,987,131 A | 11/1999 | Clapp | |
| 6,009,274 A | 12/1999 | Fletcher et al. | |
| 6,049,878 A * | 4/2000 | Caronni et al. | 726/3 |
| 6,055,575 A | 4/2000 | Paulsen et al. | |
| 6,088,336 A | 7/2000 | Tosey | |
| 6,119,228 A | 9/2000 | Angelo et al. | |
| 6,151,395 A | 11/2000 | Harkins | |
| 6,216,231 B1 | 4/2001 | Stubblebine | |
| 6,226,383 B1 | 5/2001 | Jablon | |
| 6,240,188 B1 * | 5/2001 | Dondeti et al. | 380/284 |
| 6,240,513 B1 * | 5/2001 | Friedman et al. | 713/152 |
| 6,247,014 B1 * | 6/2001 | Ladwig et al. | 707/100 |
| 6,256,733 B1 | 7/2001 | Thakkar et al. | |
| 6,263,435 B1 | 7/2001 | Dondeti et al. | |
| 6,272,135 B1 | 8/2001 | Nakatsugawa | |
| 6,279,112 B1 | 8/2001 | O'Toole, Jr. et al. | |
| 6,295,361 B1 | 9/2001 | Kadansky et al. | |
| 6,330,671 B1 | 12/2001 | Aziz | |
| 6,332,163 B1 | 12/2001 | Bowman-Amuah | |
| 6,363,154 B1 * | 3/2002 | Peyravian et al. | 380/283 |
| 6,483,921 B1 | 11/2002 | Harkins | |
| 6,507,562 B1 | 1/2003 | Kadansky et al. | |
| 6,570,847 B1 * | 5/2003 | Hosein | 370/230.1 |
| 6,584,566 B1 | 6/2003 | Hardjono | |
| 6,633,579 B1 | 10/2003 | Tedijanto et al. | |
| 6,636,968 B1 | 10/2003 | Rosner et al. | |
| 6,643,773 B1 | 11/2003 | Hardjono | |
| 6,684,331 B1 * | 1/2004 | Srivastava | 713/163 |
| 6,745,243 B2 | 6/2004 | Squire et al. | |
| 6,782,475 B1 * | 8/2004 | Sumner | 713/163 |
| 6,901,510 B1 | 5/2005 | Srivastava | |
| 6,917,685 B1 | 7/2005 | Watanabe et al. | |
| 6,941,457 B1 * | 9/2005 | Gundavelli et al. | 713/163 |
| 6,987,855 B1 | 1/2006 | Srivastava | |
| 7,013,389 B1 * | 3/2006 | Srivastava et al. | 713/163 |
| 7,089,211 B1 * | 8/2006 | Trostle et al. | 705/51 |
| 7,103,185 B1 * | 9/2006 | Srivastava et al. | 380/277 |
| 7,181,014 B1 * | 2/2007 | Srivastava | 380/278 |
| 7,260,716 B1 * | 8/2007 | Srivastava | 713/163 |
| 2003/0044017 A1 * | 3/2003 | Briscoe | 380/277 |
| 2005/0129236 A1 | 6/2005 | Sharma | |
| 2006/0168446 A1 | 7/2006 | Ahonen | |

FOREIGN PATENT DOCUMENTS

| | | |
|---|---|---|
| EP | 0 994 600 A2 | 4/2000 |
| WO | WO 0201799 A2 * | 1/2002 |

OTHER PUBLICATIONS

Varadarajan et al, Dynamic, distributed, secure multicast in active networks, 2000, IEEE, pp. 1411-1415.*

Damodaran et al, Group Key Management in Wireless Networks Using Session Keys, 2006, IEEE, pp. 402-407.*

Gerla et al, Tree multicast strategies in mobile, multihop wireless networks, 1999, ACM, pp. 193-207.*

Banerjee et al, Resilient Multicast using Overlays, 2003, ACM, pp. 102-113.*

Alfred J. Menezes, "Handbook of Applied Cryptography," 1997, CRC Press LLC., pp. 519-520.

Bruce Schneier, "Applied Cryptography," 1996, John Wiley & Sons, Inc., pp. 33-35 and 47-65.

Robert Orfali et al., "The Essential Distributed Objects Survival Guide," 1996, pp. 448-449.

David Chappell, "Understanding Microsoft Windows 2000 Distributed Services," 2000, pp. 319-324.

Robert Orfali et al., "Client/Server Survival Guide Third Edition," 1999, p. 488.

Koblitz, Neal, A Course in Number Theory and Cryptography, 1994, Springer-Verlag New York Inc. 2nd Edition, 8 pages.

IEEE Transactions On Information Theory, vol. IT-22, No. 6 (Nov. 1976) entitled "New Directions in Cryptography" by Whitfield Diffie and Martin E. Hellman.

Proceedings of the IEEE, vol. 76, No. 5 (May 1988) entitled "The First Ten Years of Public-Key Cryptography" by Whitfield Diffie.

MIT/LCS/TM-537, Laboratory for Computer Science (Aug. 1995) entitled "Guaranteed Partial Key-Escrow", Handout #13, by Silvio Micali.

Proceedings of the Fouth Annual Conference on Computer and Communications Security, ACM, 1997 (Nov. 1996) entitled "Verifiable Partial Key Escrow" by Mihir Bellare and Shafi Goldwasser.

Federal Information Processing Standards Publication 185 (Feb. 9, 1994) entitled "U.S. Department of Commernce/National Institute of Standards and Technology", Escrowed Encryption Standard, Category: Telecommunications Security.

Cylink Corporation Resouces entitled "Alternatives to RSA: Using Diffie-Hellman with DDS".

* cited by examiner

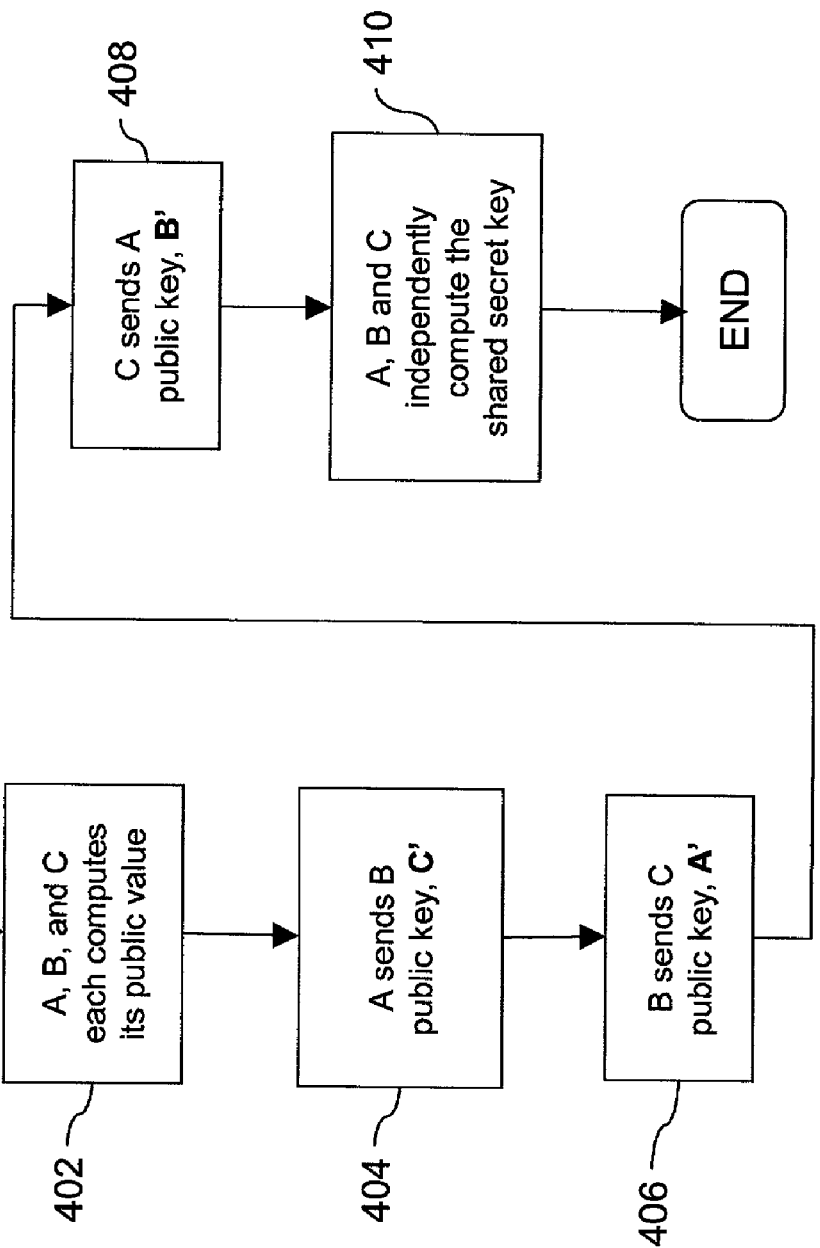

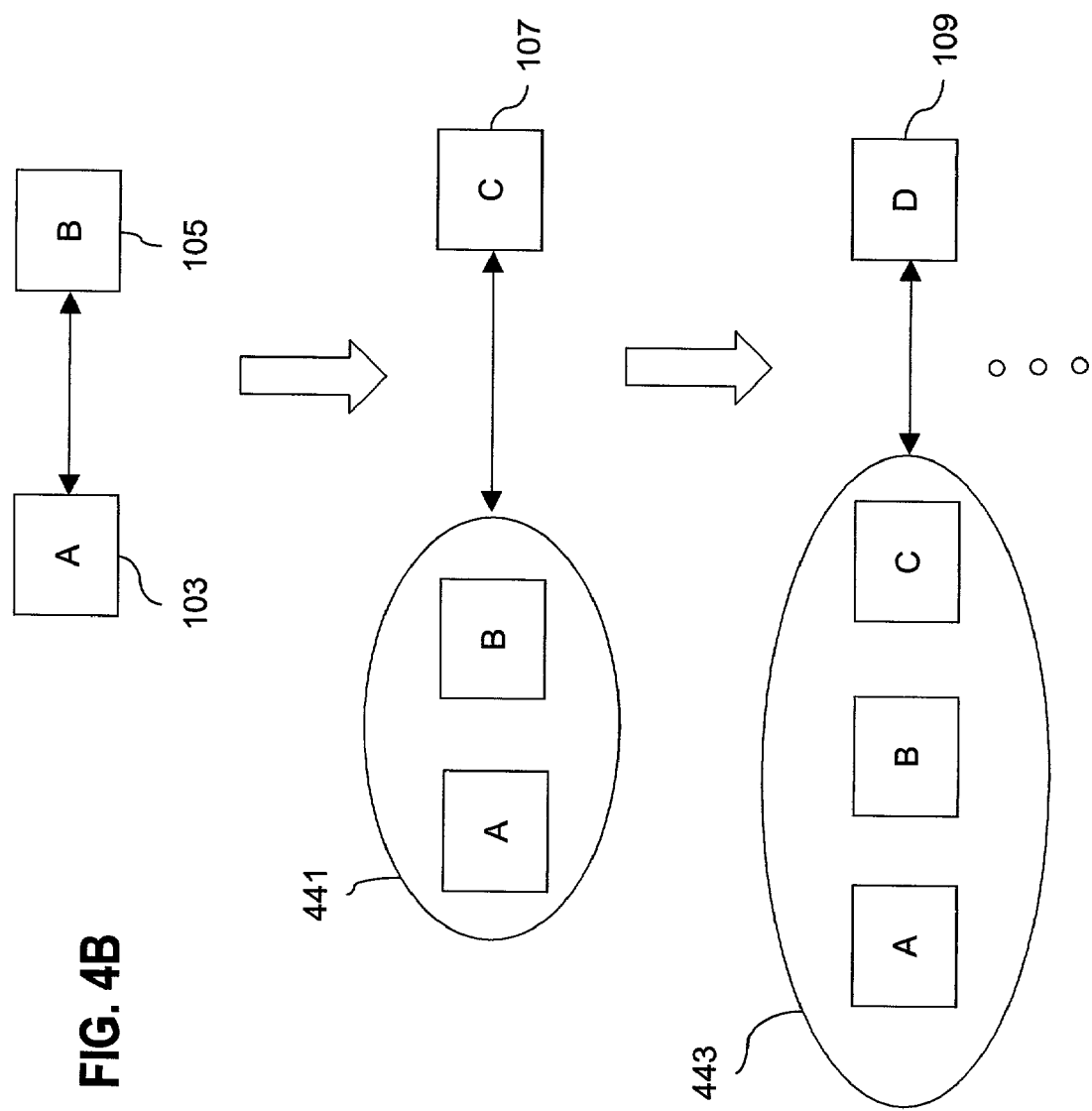

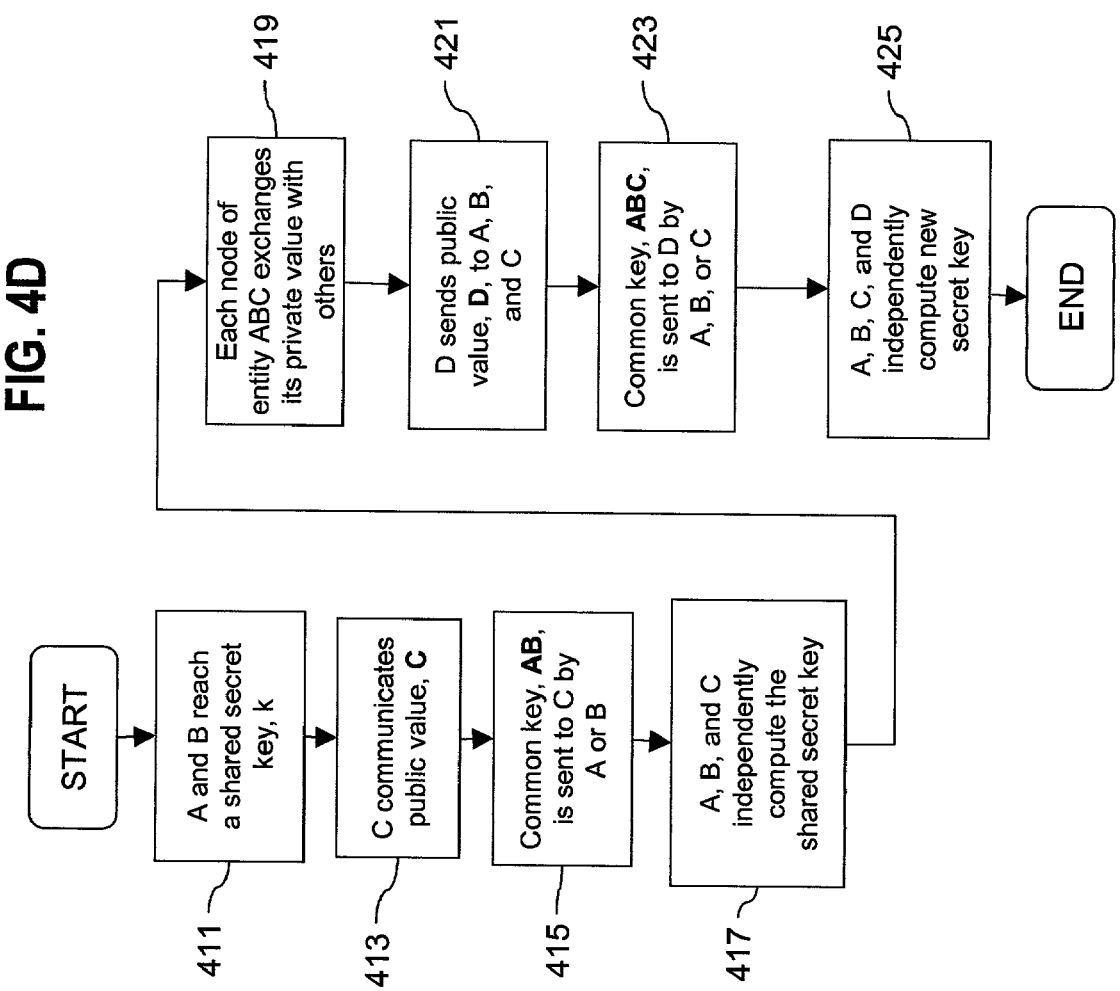

Fig. 11A

1100 MULTICAST SECURITY SYSTEM

1102
OPERATIONALLY OPTIMIZED DIFFIE-HELLMAN KEY EXCHANGE MECHANISM

1104
IMPROVED SESSION KEY EXCHANGE MECHANISM

1106
MULTICAST PROXY SERVICE NODES DISTRIBUTED OVER LAN IN LOGICAL BINARY TREE

1108
MULTICAST GROUP MEMBER NODES THAT CAN ACT AS GROUP CONTROLLERS AND KEY DISTRIBUTION CENTERS AND ARE DISTRIBUTED OVER A WAN USING A DIRECTORY

1110
KEY DISTRIBUTION USING REPLICATION OF TREE BRANCHES

METHOD AND APPARATUS PROVIDING SECURE MULTICAST GROUP COMMUNICATION

RELATED APPLICATIONS

Continuation-in-part of U.S. Ser. No. 09/393,410, filed Sep. 10, 1999, for OPERATIONAL OPTIMIZATION OF A SHARED SECRET DIFFIE-HELLMAN KEY EXCHANGE AMONG BROADCAST OR MULTICAST GROUPS, naming as inventors Sunil K. Srivastava, et al.; continuation-in-part of U.S. Ser. No. 09/393,411, filed Sep. 10, 1999, for PROCESSING METHOD FOR KEY EXCHANGE AMONG BROADCAST OR MULTICAST GROUPS THAT PROVIDES A MORE EFFICIENT SUBSTITUTE FOR DIFFIE-HELLMAN KEY EXCHANGE, naming as inventors Sunil K. Srivastava, et al.; continuation-in-part of U.S. Ser. No. 09/408,420, filed Sep. 29, 1999, for METHOD FOR OVERCOMING THE SINGLE POINT OF FAILURE OF THE CENTRAL GROUP CONTROLLER IN A BINARY TREE GROUP KEY EXCHANGE APPROACH; continuation-in-part of U.S. Ser. No. 09/407,785, filed Sep. 29, 1999, for METHOD AND APPARATUS FOR CREATING A SECURE COMMUNICATION CHANNEL AMONG MULTIPLE EVENT SERVICE NODES, naming as inventors Sunil K. Srivastava, et al.; continuation-in-part of U.S. Ser. No. 09/470,054, filed Dec. 22, 1999, for METHOD AND APPARATUS FOR DISTRIBUTING AND UPDATING PRIVATE KEYS OF MULTICAST GROUP MANAGERS USING DIRECTORY REPLICATION, naming as inventor Sunil K. Srivastava, et al.; continuation-in-part of U.S. Ser. No. 09/470,334, filed Dec. 22, 1999, for METHOD AND APPARATUS FOR DISTRIBUTING AND UPDATING GROUP CONTROLLERS OVER A WIDE AREA NETWORK USING A TREE STRUCTURE, naming as inventor Sunil K. Srivastava.

FIELD OF THE INVENTION

The invention generally relates to secure network communication. The invention relates more specifically to a method and apparatus for securing multicast group communications in a complete and scalable manner, e.g., for use in Internet Protocol multicast routing.

BACKGROUND OF THE INVENTION

The proliferation of network computing has transformed business and personal communication. The flow of information between computers continues to increase. Accompanying this increased flow of information is a concern for network security. Commercial users, who exchange confidential or company proprietary information, demand that such information is secure against interception by an unauthorized party or to intentional corruption. Participants in electronic commerce over the global Internet recognize the critical role cryptographic systems play in maintaining secure communication.

One network application that is growing in popularity is Internet Protocol (IP) multicasting, which is a bandwidth conserving technology that reduces traffic by simultaneously delivering a single stream of information to thousands of recipients. Applications that take advantage of multicast include video conferencing, corporate communications, distance learning, and distribution of software, stock quotes, and news. Historically, these applications have been run by two inefficient schemes—unicasting and broadcasting. In unicasting one copy of data is sent to each receiver. While unicasting is a simple mechanism for one-to-one communication, for one-to-many communication it causes network congestion due to its huge bandwidth demands. In broadcasting a single copy of data is sent to every user in the network, solving the bandwidth problem. However, it is not suitable if only few receivers have requested the data.

IP Multicast solves the inherent bottlenecks created when a sender needs information transferred from a single sender to multiple recipients. By sending only one copy of the information to the network and letting the network intelligently replicate the packet only where it needs to, bandwidth and network resources are conserved both on the sending and the receiving end of a transmission. However, IP Multicast requires secure management of content communication channels and the addition and deletion of members of a multicast group. In addition, IP Multicast requires knowledge of and effective use of many supporting technologies and higher-level protocols. For example, dynamic registration using Internet Group Multicast Protocol (IGMP) is required at the LAN side. For multicast forwarding, protocols such as Distance Vector Multicast Routing Protocol (DVMRP), Multicast extensions to OSPF (MOSPF), and Protocol-Independent Multicast (PIM), are used. An example of a commercial application that uses one or more of these facilities to implement multicasting is Microsoft NetShow.

However, security management and multicast address assignment are not inherently provided by these mechanisms. There is no protocol akin to Secure Sockets Layer (SSL) for carrying out security and no protocol akin to DHCP for carrying out address assignment. There is a need to provide such mechanisms for multicast.

Cryptography is the art and science of keeping messages secure. A message is information or data that is arranged or formatted in a particular way. In general, a message, sometimes referred to as "plaintext" or "cleartext," is encrypted or transformed using a cipher to create "ciphertext," which disguises the message in such a way as to hide its substance. In the context of cryptography, a cipher is a mathematical function that can be computed by a data processor. Once received by the intended recipient, the ciphertext is decrypted to convert the ciphertext back into plaintext. Ideally, ciphertext sufficiently disguises a message in such a way that even if the ciphertext is obtained by an unintended recipient, the substance of the message cannot be discerned from the ciphertext.

Many different encryption/decryption approaches for protecting information exist. For example, for small applications that require a relatively low level of security, a traditional restricted algorithm approach may be appropriate. With a restricted algorithm approach, a group of participants agree to use a specific, predetermined algorithm to encrypt and decrypt messages exchanged among the participants. Because the algorithm is maintained in secret, a relatively simple algorithm may be used. However, in the event that the secrecy of the algorithm is compromised, the algorithm must be changed to preserve secure communication among the participants. Scalability, under this approach, is an issue. As the number of participants increases, keeping the algorithm secret and updating it when compromises occur place an undue strain on network resources. In addition, standard algorithms cannot be used since each group of participants must have a unique algorithm.

Other approaches use a key-based algorithm. Generally two types of key-based algorithms exist: (1) symmetric algorithms and (2) asymmetric algorithms, of which one example is a public key algorithm. A key forms one of the inputs to a mathematical function that is used by a processor or computer to generate a ciphertext.

Public key algorithms are designed so that the key used for encryption is different than the key used for decryption. These algorithms are premised on the fact that the decryption key cannot be determined from the encryption key, at least not in any reasonable amount of time with practical computing resources. Typically, the encryption key (public key) is made public so that anyone, including an eavesdropper, can use the public key to encrypt a message. However, only a specific participant in possession of the decryption key (private key) can decrypt the message.

Public key algorithms, however, often are not employed as a mechanism to encrypt messages, largely because such algorithms consume an inordinate amount of system resources and time to encrypt entire messages. Further, public key encryption systems are vulnerable to chosen-plaintext attacks.

As a result, a public key cryptosystem generally is utilized to establish a secure data communication channel through key exchanges among the participants. Two or more parties, who wish to communicate over a secure channel, exchange or make available to each other public (or non-secure) key values. Each party uses the other party's public key value to privately and securely compute a private key, using an agreed-upon algorithm. The parties then use their derived private keys in a separate encryption algorithm to encrypt messages passed over the data communication channel. Conventionally, these private keys are valid only on a per communication session basis, and thus, are referred to as session keys. These session keys can be used to encrypt/decrypt a specified number of messages or for a specified period of time. A session can refer to a period of time in which a specified set of clients participate in a multicast group.

Once a multicast group is established, management of the session keys after group membership changes poses problems. Forward secrecy, which arises when a member node leaves the multicast group and may still possess the capability to decipher future messages exchanged among the group, becomes a concern. In addition, in the case where a new member node enters the multicast group, the new member should not be permitted to decrypt the past messages of the multicast group. Another consideration involves making session key updates when a multicast "join" or "leave" occurs; updates must be rapid to prevent undue system delay so that the network scales to accommodate additional users.

Another conventional technique used to establish secure communication employs a trusted third party authentication mechanism, such as a certificate authority ("CA") or key distribution center ("KDC") to regulate the exchange of keys. FIG. 9 is a block diagram of a system that uses a single central group controller (GC) 901 that has responsibility for distributing, creating, and updating session keys to members of a multicast group comprising users A-H. The eight users, A-H, communicate with group controller 901 via separate point-to-point channels or connections 903 to obtain a dynamic group session key. The connections 903 can be made secure by using a standard Diffie-Hellman key exchange protocol. Group controller 901 may be, for example, a router that uses IGMP and related protocols to manage multicast applications.

The group controller preferably determines or comes to a shared group session key using a binary tree approach as described herein. The KDC or CA carries out a third party authentication. The keys can be sent in a multicast or broadcast messages or overlapping broadcast or multicast messages or many point to point messages. In an embodiment, the authentication occurs over a point-to-point secured channel. The updated group session key can only be sent to the new member over the secured channel, which is point to point. The same key can also be sent to other trusted member KDCs or CAs over an out-of-band and orthogonal secured multicast or broadcast group, and it is assumed that such group has previously built a secured channel with different means.

Diffie-Hellman is not required to secure communications with the group controller, as the binary tree approach provides it. For point-to-point communication, a unicast version of Diffie-Hellman can be used. A group controller could use a multicast version of Diffie-Hellman, although it treats every member as a peer and GC is only required for authenticating members but is also a permanent member) as well as the Binary Tree Algorithm. If it is communicating to each member point to point, it can as well use any arbitrary mechanism to come to a Group Session Key and send it individual members. Multicast version of Diffie-Hellman and the Binary Tree methods are for multicast or broadcast nature of exchanges, where Multicast version needs no central authority (except for the need to authenticate as well) and the Binary Tree method needs a central authority as GC.

Ideally, only one message from the group controller is needed. Alternatively, Diffie-Hellman is used to do a point to point communication with the CA or KDC, and the CA or KDC can give out a group session key without using the binary tree approach. All nodes get the same session key using N−1 point to point messages, where "N" represents the number of multicast group members. These two approaches are orthogonal and can be combined for optimization.

To set up the secured channel among the nodes, N−1 messages are exchanged, wherein N is the number of nodes. A major drawback of this approach is that the group controller 901 represents a single point of failure, and therefore the system lacks fault tolerance. If the group controller 901 is down, no secure communication can exist among the multicast group of users A-H. Such a prospect is unacceptable, especially in mission critical systems.

Another drawback is that the group controller 901 is a potential bottleneck in the network when a binary tree algorithm is used, and the KDC or CA are potential bottlenecks when other mechanisms are used. For instance, if multiple nodes request to join the multicast group, the group controller 901 may not be able to process all such requests in a timely manner. This problem may be acute if the multicast group is over a wide area network (WAN). Further, a system dependent upon a group controller 901 is not easily enlarged or scaled, due, in part, to physical hardware constraints.

Accordingly, there is a clear need for improved approaches to setting up and managing multicast groups.

In particular, there is a need for a way to carry out secure, scalable multicast key distribution at the LAN level. If more than one multicast key distribution agent is used, there is a need to provide a secured channel among the distributed multicast key distribution agents at the LAN level.

There is also a need for a way to provide improved utilization of multicast key distribution agents at the WAN level. A particular need is achieving near perfect forward security and near perfect backward security in each key distribution node.

There is also a need for a way to reduce the overhead involved in calculating new keys.

SUMMARY OF THE INVENTION

The foregoing needs, and other needs and objects that will become apparent from the following description, are fulfilled by the present invention, which comprises, in one aspect, an approach for establishing secure multicast communication among multiple multicast proxy service nodes of domains of a replicated directory service that spans a wide area network. In this context, "multicast proxy service node" refers to a Multicast Service Agent, Multicast KDC, and/or Group Controller. The multicast proxy service nodes are made scalable at the LAN level. In one feature, the multicast proxy service nodes are arranged in a binary tree architecture at the LAN level, thereby eliminating the single point of failure of traditional approaches. In another feature, scalability is achieved by using an operationally optimized broadcast version of Diffie-Hellman key exchange that reduces the number of rounds of messages needed to exchange keys. In still another feature, scalability is achieved using a new method for coming to a shared secret in nodes of a broadcast group. Using either feature, a secured communication channel is provided among a plurality of distributed multicast proxy service nodes at the LAN level.

According to another feature, a tree approach is used to spread the multicast proxy service nodes at the WAN level, further improving scalability. A directory replication approach is used to distribute private keys of the multicast proxy service nodes, thereby achieving near perfect forward and backward security among nodes at the WAN level. A binary tree architecture is adopted to distribute group controllers over a WAN, and exploited to reduce the overhead involved in calculating "disturbed" or "revised" keys by limiting the locality of disturbance by having a local multicast key distribution node serve as a local group member and also manage joining new nodes.

The domains are logically organized in the form of a first binary tree and each domain stores a logical sub-tree that organizes the multicast proxy service nodes. Each domain also comprises a group controller at the root node of the sub-tree, a key distribution center, multicast service agent, and directory service agent.

Multicast proxy service nodes each stores the private keys of group members for authentication purposes and the latest group session key, which it also communicates to its peer Proxy Service Nodes using the out-of-band, orthogonal secured channel. The Proxy Service Node is also a directory service node and hence it knows the private keys and latest session keys of peer directory nodes through secured directory replication. Using the replicated private keys and latest session keys, which do not change that often as the Directory Service Agents are more or less static members, these agents come to a shared secret channel among themselves to communicate the multicast group session key updates for multicast groups whose members are dynamic and join and leave often.

Replication of the directory accomplishes distribution of keys. Specifically, the MSAs form a group among themselves using directory replication and distribute keys.

The binary tree structure may be exploited by establishing a second binary tree having real nodes that are MSAs as part of the binary tree of group of nodes for Publishers and Subscribers. The intermediate nodes of the second binary tree are MSAs that form a "back channel" group with other MSAs for secure communications, but with other real subscribers and publishing nodes, they form a different group and act like a local root node for the sub-tree.

A multicast group member joins or leaves the group by publishing a message. The local key distribution center and multicast service agent obtains its own identifier from the binary tree for a publisher specific group. A secure channel is established with other MSA nodes in the binary tree for the publisher specific group. All keys of the binary tree branch that contains the joining or leaving node are updated, an updated group session key and a new private key are received.

Intermediate nodes of a binary tree represent actual multicast group members. This arrangement more naturally accommodates superimposition of multicast routing trees, reliable multicasting transport trees, hierarchical cache chaining structures, and directory trees. Using the intermediate nodes, the number of group members and keys is $2^{N+1}-1$, and each group member stores $\log_2 n$ keys, where n defines the level in a tree, ranging from 0 to N, and N is the number of nodes in the tree.

Under this approach, there is flexibility in implementation with regard to joining and leaving the multicast group. The number of keys affected is essentially $2 \log_2 N - 2 \log_2 n$. Each intermediate node behaves as a group controller for its branch of the tree by changing the keys of only nodes within its branch that are affected when a node joins or leaves. This reduces the workload on the group controller. As a second option, the intermediate node requests a new session key from the group controller or requests permission to create a new session key.

In the case where the group controller creates a new group session key, the group controller encrypts the new session key with the private key of the intermediate node. However, if the group session key results from a member leaving the multicast group, the intermediate node changes its key(s) since such keys were known by the leaving node. To do so, the intermediate node has a separate secured private channel with the group controller. Using this private channel, the intermediate node sends the group controller its updated keys. Alternatively, the intermediate node (which is acting as a sub-group controller) decrypts the group session key from the group controller and then encrypts the group session key with the newly created keys associated with the affected nodes.

Thus, in the approach of the invention, the Multicast GC's, MKDC, MSA nodes form a group among themselves and use directory replication to distribute group session keys and keys for branches of the binary tree. A first binary tree may be used for secure back channel communication; other methods also may be used to establish the secure back channel. In the approach of this invention, a second tree comprises many real nodes in that are also part of the first tree, and the intermediate nodes in the second tree act like a local group controller to spread other group controller nodes over a WAN. An advantage of this approach in which intermediate nodes act as a local group controller is that the tree keys affected are local and the only global keys affected are the local group controller's private key and the group session key. The local group controller can change its private key and update all group controllers using the private channel. The group session key can be also be changed and other group controllers can be made aware of the change. Or, a "back channel" can be used to request the root group controller to update the private session group key.

As a result, a complete, scalable, multicast group security approach is provided.

BRIEF DESCRIPTION OF THE DRAWINGS

Embodiments are illustrated by way of example, and not by way of limitation, in the figures of the accompanying drawings in which like reference numerals refer to similar elements and in which:

FIG. 4A, FIG. 4B, FIG. 4C, and FIG. 4D are diagrams illustrating methods for key exchange.

FIG. 11A is a block diagram of elements of a complete multicast security solution.

DETAILED DESCRIPTION OF THE PREFERRED EMBODIMENT

Figure 1:
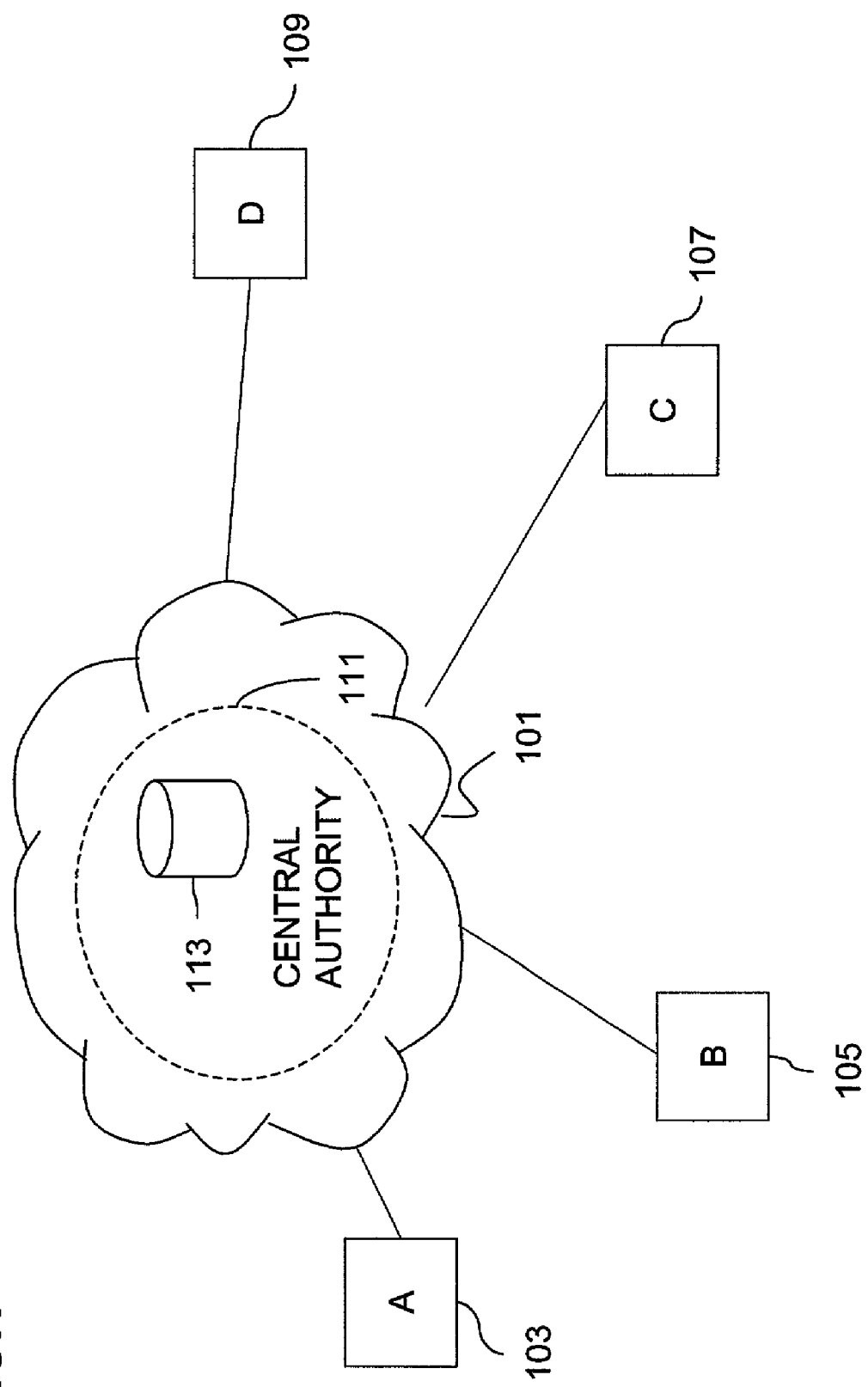
FIG. 1 is a block diagram of a secure communication system employing acentral authority such as a key distribution center (KDC).

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Functional and Structural Overview

An approach for creating a secured multicast group in a communications network uses a distributed system to disseminate and update group session keys. To establish a secured channel among the participating multicast group members, a group controller approach is used. However, functionality of the group controller is distributed across multiple network entities, which communicate out of band among themselves over a secure back channel. The distributed entities use various key exchange algorithms to securely communicate. The back channel can be the multicast channel with messages secured using replicated keys through a directory, or it can be a point-to-point secured channel. The back channel does not need a Group Controller.

The key exchange approach generates session keys based on a public key scheme, without needing to rely on a group controller approach. Further, the approach exploits the commonality between the physical topology of directory-based domains (as well as multicast routing trees) and the structure of a binary tree to establish a network of group controllers that efficiently manages membership within a secure multicast or broadcast group.

A trusted intermediary, called a Central Authority (CA), Key Distribution Center (KDC) or Group Controller (GC), has the responsibility of distributing the stored public keys to the multicast group members. The KDC accomplishes this task by encrypting the public keys with its private key, which is shared with each of the group members. The group members then decipher the encrypted message to determine each others' public keys. In addition to publishing public keys by which session keys may be derived by the group members, the KDC may distribute actual session keys.

Although the description herein refers interaction with multicast groups as an example, approaches described herein are equally applicable to broadcast group management.

FIG. 11A is a block diagram of elements of a complete multicast security solution according to one embodiment. In this embodiment, a multicast security system 1100 comprises an operationally optimized Diffie-Hellman key exchange mechanism 1102 or, alternatively, an improved session key exchange mechanism 1104 as described further herein. Multicast security system 1100 also has multicast proxy service nodes that are distributed over a LAN in a logical binary tree, as indicated by block 1106, and multicast group member nodes that can act as group controllers and key distribution centers and that are distributed over a WAN using a directory, as indicated by block 1108. Multicast security system 1100 also includes a key distribution mechanism that uses replication of tree branches, as indicated by block 1110. Each of the elements of FIG. 11A may be implemented in one or more software elements that carry out the functions described herein and that operate, alone or in cooperation, at a network element such as a router, switch, or gateway.

Figure 11B:
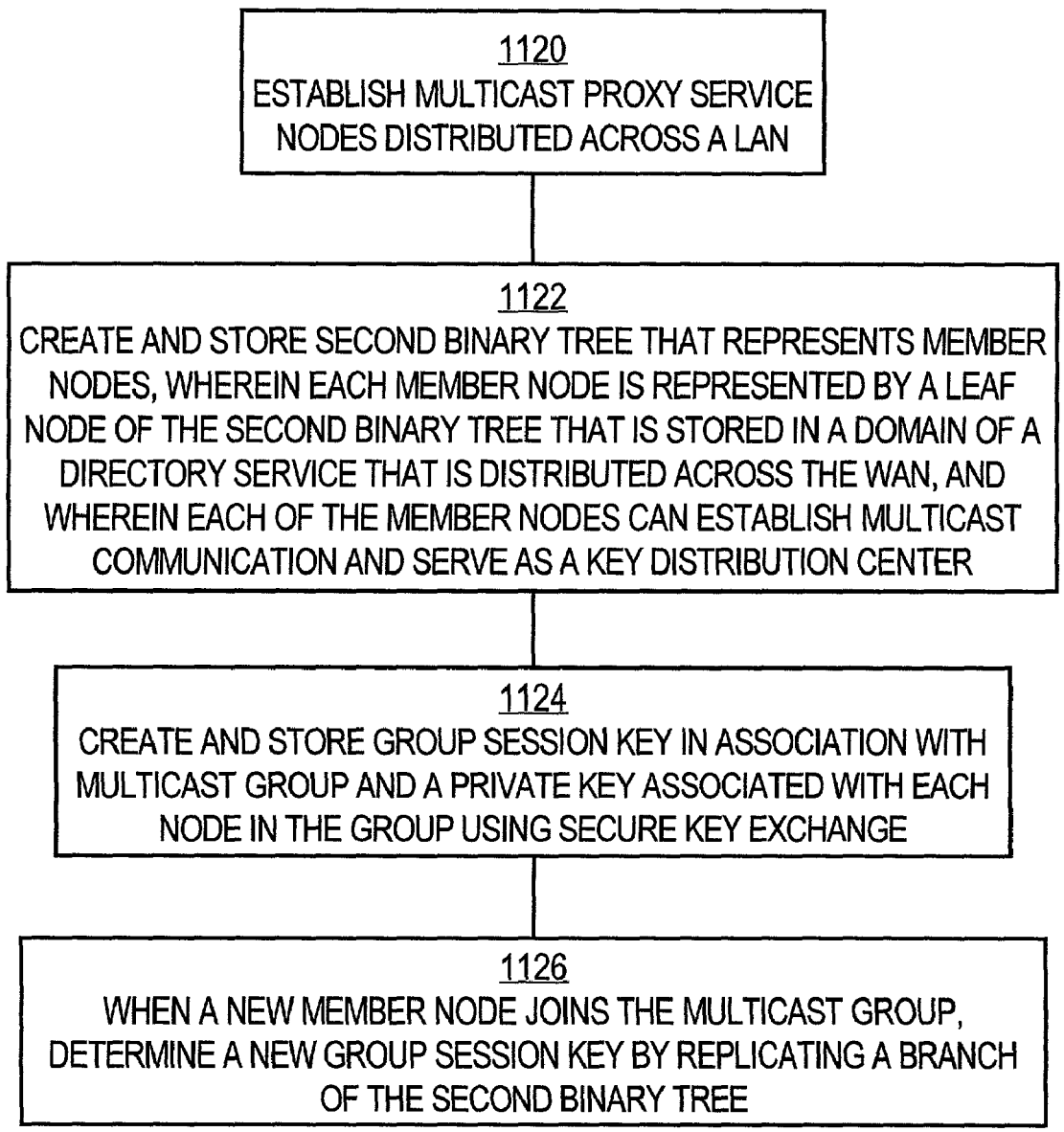
FIG. 11B is a flow diagram of a method of securely establishing a multicast communication session among a plurality of member nodes that participate in a multicast group across a wide area network.

FIG. 11B is a flow diagram of a method of securely establishing a multicast communication session among a plurality of member nodes that participate in a multicast group across a wide area network, according to one embodiment. In block 1120, multicast proxy service nodes are established in a manner that distributes the nodes across a LAN. In block 1122, a second binary tree is created and stored for representing the member nodes, wherein each of the member nodes is represented by a leaf node of the second binary tree that is stored in a domain of a directory service that is distributed across the wide area network, and wherein each of the member nodes is capable of establishing multicast communication and serving as a key distribution center.

In block 1124, a group session key is created and stored, in association with the multicast group and a private key associated with each node in a group using secure key exchange. When one of the member nodes joins the multicast group, as indicated by block 1126, a new group session key is determined by replicating a branch of the second binary tree.

FIG. 1 shows an exemplary implementation with four users A, B, C, D connected via network 101. The network 101 may be a packet switched network that supports the Internet Protocol (IP). A Central Authority 111, which is a third party trusted authentication authority, is hosted in network 101. In an embodiment, Central Authority 111 is a distributed multicast subnetwork made up of multiple KDCs, CAs, or GCs that are interconnected over secured channels in a hierarchical relationship. Among other functions, Central Authority 111 provides authentication and validation services when individual nodes join the multicast group. Although four (4) users A, B, C, D are shown as an example, any number of users or nodes can be used.

Central Authority 111 may be a KDC subnetwork in an environment that uses an exchange of Kerberos credentials for communications security. However, any other suitable central authority mechanism may be substituted. For example, a certificate authority (CA) may be used as Central Authority 111 when a public key infrastructure (PKI) is used for communications security in the network.

Central Authority 111 establishes point-to-point communication with the workstations 103, 105, 107, 109 to authenticate them. Workstations 103, 105, 107, 109 obtain dynamic session keys from the Central Authority 111 for subsequent secure communication among themselves. In this case, Central Authority 111 generates the session key. Alternatively, one of the nodes 103, 105, 107, 109, which initiates communication with the multicast group, may generate and supply a dynamic group key based on a symmetrical cryptographic algorithm to the Central Authority 111. Thereafter, other nodes seeking to participate in the secure communication may request this group session key from the Central Authority 111, which distributes it using secured point-to-point communication.

For purposes of illustration, assume that user A desires to publish a message to the other users B, C, D. As a publisher, user A encrypts the message with the dynamic group session key and signs a message digest with its private key. The message digest can include a time-stamp and serial number for authentication purposes. If user A is trusted by the other users B, C, D, user A itself can assume the role of a KDC.

If each of the members of the multicast group (e.g., A, B, C, D) can be either a publisher or a subscriber, then each individual group member can employ the group session key when it publishes a message. Subscribers are required to know the group session key to decrypt the message. Normally the group session key is not used as a signature because it could be used to spoof a publisher and send an unauthorized message. Accordingly, third party authentication is used and message signatures are constructed from a publisher's private key, message digest and time stamp.

In an exemplary embodiment, the group members initially authenticate themselves by using a certificate authority (CA) or a Kerberos KDC, in which case the session keys need not serve as authentication signatures or certificates. Kerberos is a known key based authentication service. The directory can provide Kerberos service on a number of operating systems (e.g., Windows, UNIX, etc.). A CA with the Secure Sockets Layer may be used, or Kerberos may be used, coupled through the Generic Security Service Application Programming Interface (GSS-API).

Central Authority 111, like the GC or KDC, is a distributed Multicast KDC (MKDC), comprising a designated or root MKDC that tracks group membership information and conveys such information to other MKDCs. Each of the MKDCs serves its own geographic region of users. The other MKDCs that form Central Authority 111 are interconnected over secured channels, and are arranged in a hierarchical relationship overlapping LDAP domains, network domains, router trees and reliable transport trees. The secure channels linking the MKDCs are established using a public key exchange protocol, such that participants in the exchange can derive a common group key without intervention from a third party, such as another group controller. Alternatively, protocols such as broadcast Diffie-Hellman can be used to establish the secure channels. In another alternative, keys replicated using directory services can be used to create a secure back channel. MKDCs are suited to take advantage of such protocols because they tend to remain static during joins and leaves of other nodes from the multicast group. Thus, the frequency of a MKDC joining and leaving a group of MKDCs is relatively low. Further, MKDCs are inherently trusted systems. Using distributed directory service replications, they can build secure point to point channels among themselves. Then, using directory replication, group keys and group rekeyings can be spread, so that the MKDC, MSA, or Multicast Group Controller nodes become near static.

In one embodiment, the Central Authority 111 is a distributed, near-statically replicated or low latency directory, which provides the services of the KDC. A directory is a logically centralized, highly distributed data repository that can be accessed by the applications. The distributed nature of directories is achieved by replicating data across multiple directory servers, which are strategically located throughout the network, in part, based upon traffic engineering considerations. A directory creates active associations among users, applications, a network, and network devices. Directories can store information about network elements, services, and policies to enable ease of network administration and security. In particular, a directory can supply authentication services, whereby all users, applications, and network devices can authenticate themselves through a common scheme.

A directory server can be implemented as a distributed, replicated, object database, in which one or more master copies of the database are maintained along with a number of replicas. One type of directory is Microsoft Active Directory from Microsoft Corporation. Active Directory is a directory that uses a data storage schema as defined by the Directory-Enabled Networks (DEN) definition, and is based upon Lightweight Directory Access Protocol (LDAP). LDAP is a directory standard that is based upon the ITU (International Telecommunications Union) X.500 standard. LDAP provides client access to X.500 directory servers over a TCP/IP (Transmission Control Protocol/Internet Protocol) network. The details of LDAP are set forth in RFC 1777 and RFC 2251, which are hereby incorporated by reference in their entirety as if fully set forth herein. X.500 employs a distributed approach in which information is stored in Directory System Agents (DSAs).

In the system of FIG. 1, the directory may contain user account or security principal information for authenticating users or services along with the shared secret key between the members A, B, C, D and the directory. This information may be stored in a database 113, which can reside within each KDC or can be shared among two or more KDCs. Users A, B, C, D authenticate themselves using the security services of the directory. Further, some of the directories can serve as CAs, or work cooperatively with CAs. The secured channels within the Central Authority 111 can be established using the key exchange method discussed below with respect to FIG. 4A, FIG. 4B, FIG. 4C, FIG. 4D.

Figure 2A:
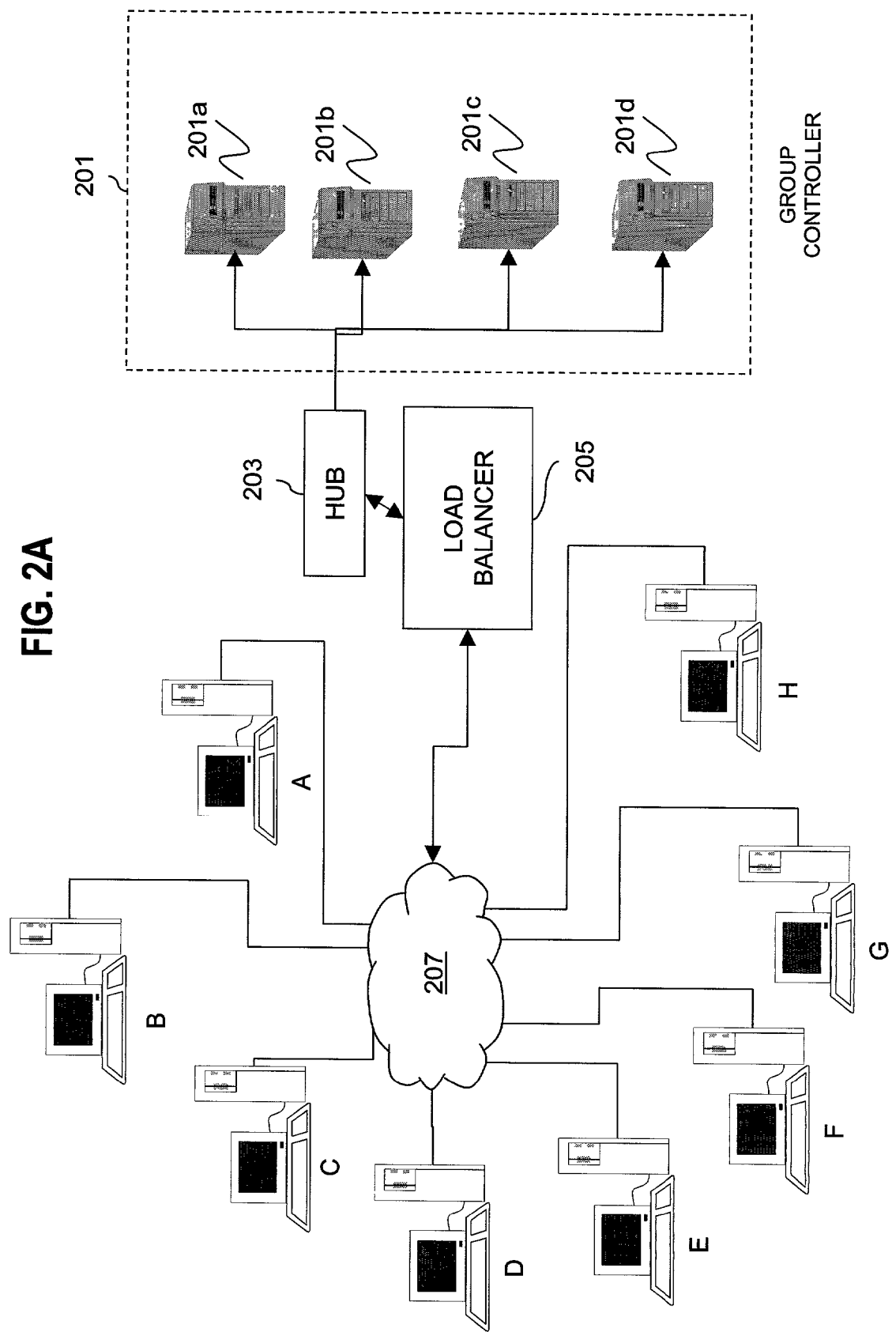
FIG. 2A, FIG. 2B, and FIG. 2C are block diagrams of a secure network utilizing a group controller.

FIG. 2A shows an exemplary embodiment of a clustered central KDC, CA or GC. The clustered central KDC 201 is shown in the form of a "server farm," comprising multiple KDC servers 201a-201d. KDC servers 201a-201d communicate through a hub 203, which may use any suitable LAN technology such as Ethernet or token ring. A load balancer 205 is linked to hub 203 to load balance the traffic from network 207, which in this example is an IP network. The load balancer 205 provides virtual server capability to represent KDC 201 as single entity to the users A-H. Thus, KDC 201 effectively has a single address, such as one IP address. The load balancer 205 can effectively direct traffic across all the KDC servers 201a-201d by mapping the one virtual IP address to the true addresses of the individual servers. With this approach, additional KDC servers can be readily added to supply security services to new users, thereby improving scalability. Normally the load balancer 205 is implemented as an IP layer router or switch.

Figure 2B:
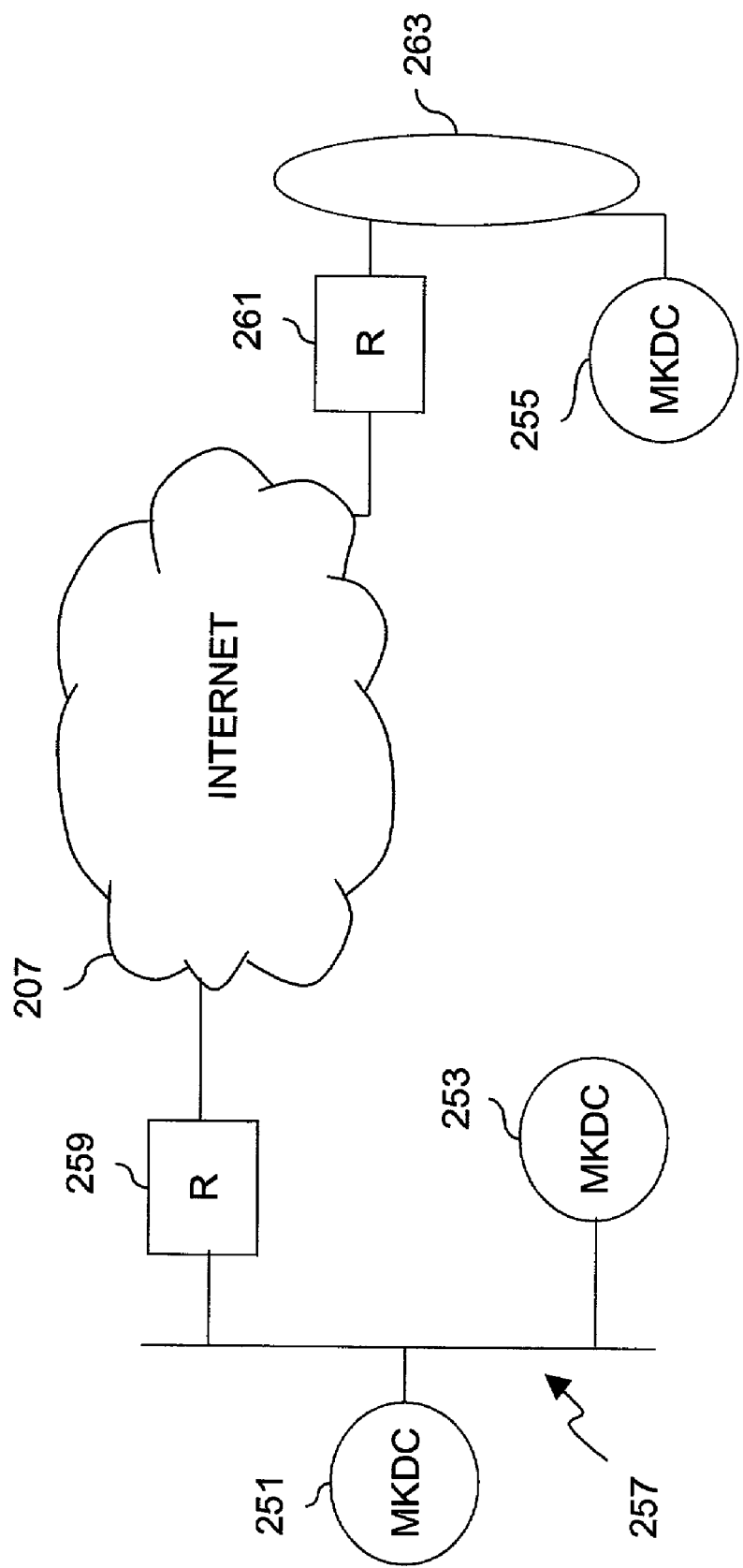

FIG. 2B shows another way to scale a system in which MKDCs 251, 253, 255 are distributed over a network at the LAN and/or WAN level. The MKDCs can be within the same or different domains. A domain is defined as a network or subnetwork that is under control by a single network management entity.

To effectively serve users, MKDCs 251, 253, 255 communicate over secure channels themselves to exchange dynamic group session keys. In this exemplary enterprise network, MKDC 251 and MKDC 253 are connected via an Ethernet LAN 257, which is further linked to a network 207, such as the global packet switched network known as the Internet, through router 259. Another MKDC 255 resides on a remote LAN 263. Logically separate from LAN 257, router 261 couples Internet 207 to network 263, which has MKDC 255. Thus, MKDC 251, 253 are distributed across LAN 257 and MKDC 251, 253, 255 are distributed across a WAN.

FIG. 2B shows LAN 263 as a token ring network, however, other types of LANs may be utilized. Secure channels can be established among MKDCs 251, 253, 255 using various key exchange protocols for multiparty communication, as discussed below in connection with FIG. 4A, FIG. 4B, FIG. 4C, FIG. 4D.

Figure 2C:
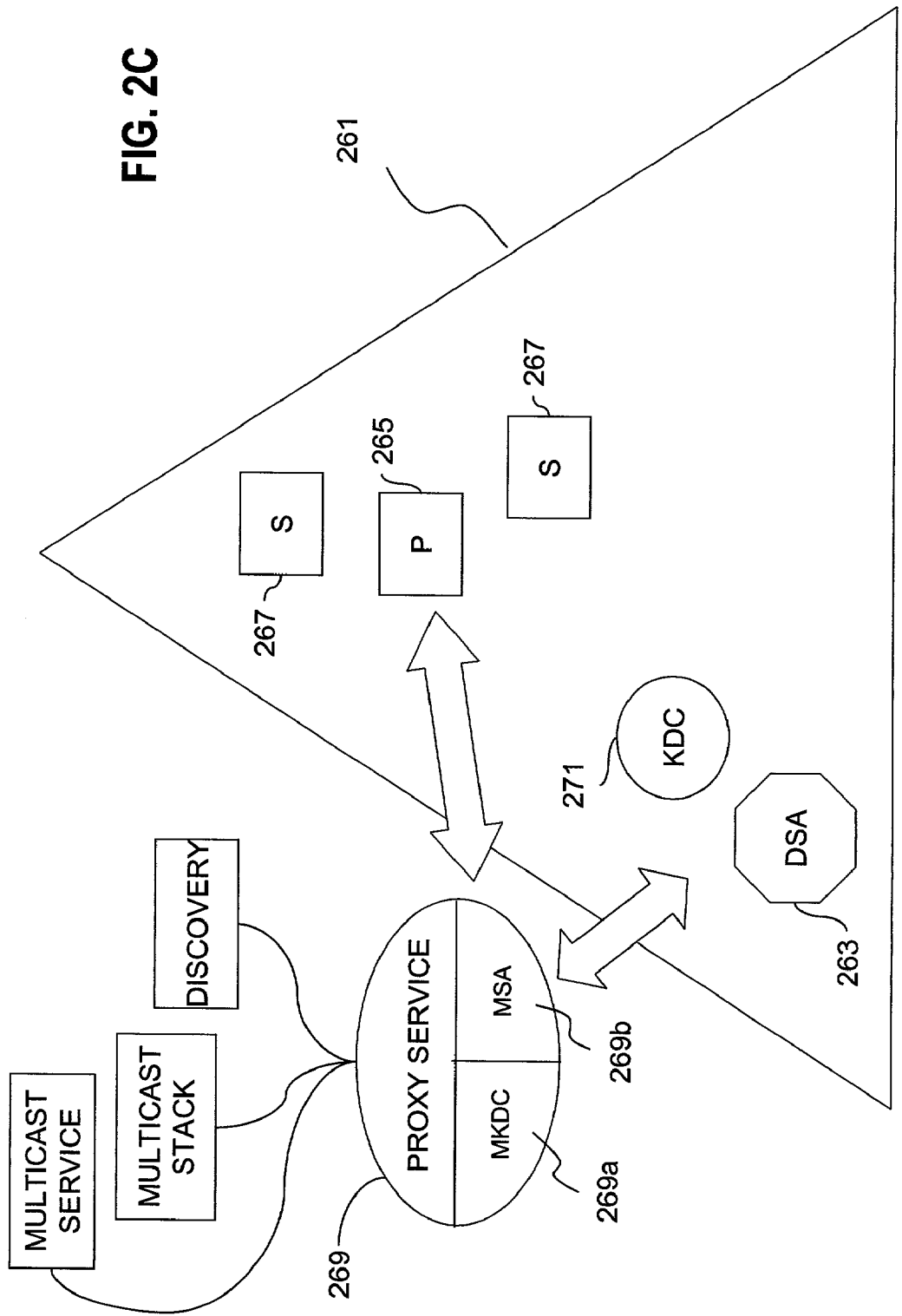

FIG. 2C shows a distributed MKDC architecture that employs directory services to create secure channels among the MKDCs, wherein MKDC functionality is a part of a Multicast Proxy Service node 269 ("Proxy Service 269"). The Proxy Service 269 enables directory principals, such as users, applications, and network devices, to store event types in the directory. These events are queued in specific event queues, in which subscribers 267 (also called consumers) may register to receive such events. Proxy Service 269 has three principal functions, as shown in FIG. 2C: (1) providing multicast service in case multicast service is not available to a local node, (2) providing a reliable multicast stack; and (3) providing discovery of multicast addresses, topic names, channels, or event types that can be published or subscribed.

Proxy Service 269 includes a multicast service agent (MSA) 269b and may be distributed across LANs and WANs, including spanning directory domains, multicast routing and transport trees in an enterprise network. Distribution may be at all levels, such as within a domain, among domains, within or among trees, etc.

The term "multicast proxy service node" is also used in this document to refer broadly to Multicast Group Controllers (MGCs), MSAs, and MKDCs. These elements may be integrated within a KDC or CA or MSA, or can be implemented as separate logical elements that communicate with an MSA. Separately or collectively, these elements form an multicast proxy service node.

As an example, FIG. 2C illustrates interaction between one MSA with various entities within one directory domain 261. FIG. 2C illustrates Proxy Service 269 outside domain 261, however, it may also be located within the domain. Domain 261 has at least one directory system agent (DSA) 263 and an associated KDC 271. Also within domain 261 are a publisher 265 and subscribers 267. DSA 263, in one implementation, is a database in which information is stored in accordance with X.500 or LDAP. Information is exchanged with other DSAs using the Directory System Protocol (DSP). Such information may be stored as entries to an object class, in which the actual values in an entry are called "attributes." The object class defines the types of attributes an entry may possess. Subscribers 267 can access the directory through a Directory User Agent (DUA).

Publisher 265 and subscribers 267 communicate with Proxy Service 269, including MKDC 269a and MSA 269b, to authenticate themselves, to discover what events they can publish or subscribe, respectively, and to obtain a group session key. To authenticate publisher 265 and subscribers 267, MKDC 269a, a group controller, and MSA 269b utilize DSA 263, a CA and KDC 271. The publisher 265, subscribers 267, MKDC 269a, and MSA 269b are security principals with respect to DSA 263. That is, publisher 265, subscribers 267, MKDC 269a, and MSA 269b can sign into the system by supplying their credentials. The MKDC 269a creates a group session key that is specific to a publisher. As a result, when the information is replicated across the network or enterprise, local copies of the directory can be used to obtain a common group session key. It cannot support dynamic groups, however, the MKDCs are trusted nodes that do not often fail and restart; accordingly, the DSA can be used to send a group session key.

To ensure continued secured communication, changing the group session keys periodically among the MKDCs is desirable. MSA 269b, which is specific to publisher 265, generates a number of keys sufficient to enable it to cycle through numerous group session keys to prevent an unauthorized user from intercepting and using these keys. Such keys may be selected among MKDCs based on providing their date and timestamp to an algorithm that generates a key version value.

As an example, FIG. 2C shows one domain 261 that is served by one Multicast Proxy Service node 269. However, in a complex enterprise network, MKDCs may span thousands of domains, posing difficulty in directory replication. One approach is to have subscribers, which may reside in any number of domains different from a publisher, request group membership from the KDC in the publisher's domain. Further, in practice a directory may have or cover any number of domains. In a directory with multiple domains, each domain has a KDC and a DSA.

Establishing Secure Communication Among Multicast Proxy Service Nodes

Figure 3:
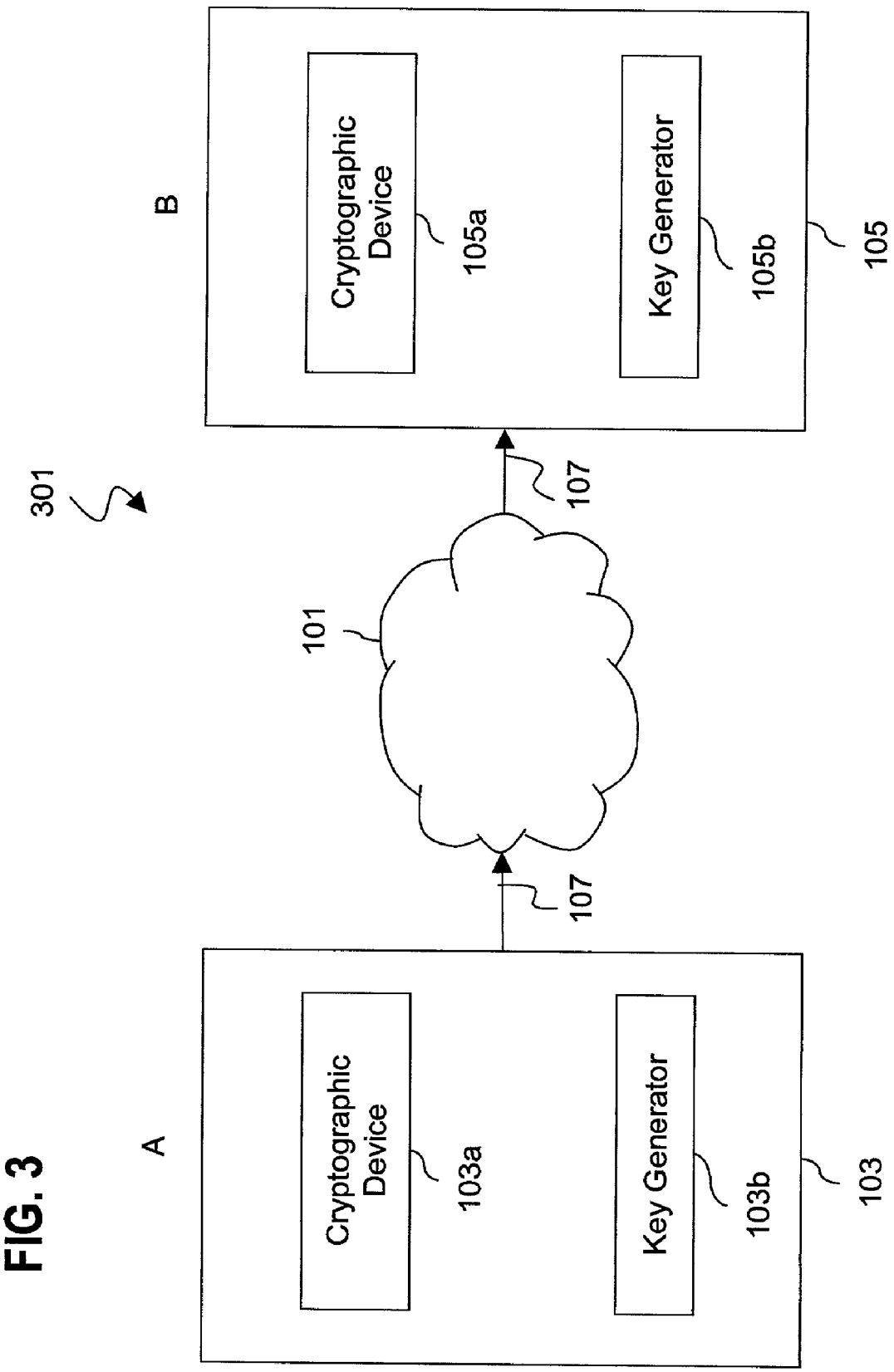
FIG. 3 is a block diagram illustrating the security mechanisms for providing secure communication between two participants in the system of FIG. 1.

FIG. 3 illustrates a communication system 301 that provides a secure channel between two participants. User A employing workstation 103 communicates with another workstation 105 of user B over a link 107. Link 107 is established over network 101, which includes, but is not limited to, a LAN, a WAN, the global packet-switched network known as the Internet, a wireless transmission medium, or any other medium for exchanging information between the participants. In addition, link 107 may be non-secure, thereby allowing third party access to information transmitted by the link 107, or alternatively, link 107 may be secure.

Workstations 103, 105 have components with complementary functions. Workstation 103 of user A includes a key generator 103b and a cryptographic device 103a. Key generator 103b generates public and private keys used for encrypting and decrypting information exchanged with workstation 105 of user B. Cryptographic device 103a encrypts and decrypts information exchanged with workstation 105 using private and public keys generated by key generator 103b. Similarly, workstation 105 includes a key generator 105b and a cryptographic device 105a. Key generator 105b supplies public and private keys that are used to establish a secured link 107 with workstation 103. Information exchanged with workstation 103 is encrypted and decrypted by cryptographic device 105a using private and public keys generated by key generator 105b.

Participants 103, 105 can utilize various key exchange protocols, such as the Diffie-Hellman method or the improved method discussed below, to exchange their keys. As a result, participants 103, 105 can securely exchange information over link 107 using a public key exchange protocol such that an eavesdropper having access to ciphertext transmitted on link 107 cannot feasibly decrypt the encrypted information.

A known public key exchange method is the Diffie-Hellman method described in U.S. Pat. No. 4,200,770. The Diffie-Hellman method relies on the difficulty associated with calculating discrete logarithms in a finite field. According to this method, two participants, A and B, each select random large numbers a and b, which are kept secret. A and B also agree publicly upon a base number p and a large prime number q, such that p is primitive mod q. A and B exchange the values of p and q over a non-secure channel or publish them in a database that both can access. Then A and B each privately computes public keys A and B, respectively, as follows:

A privately computes a public key A as: $A = p^a \mod(q)$ (1)

B privately computes a public key B as: $B = p^b \mod(q)$ (2)

A and B then exchange or publish their respective public keys A and B and determine private keys $k_a$ and $k_b$ as follows:

A computes a private key $k_a$ as: $k_a = B^a \mod(q)$ (3)

B computes a private key $k_b$ as: $k_b = A^b \mod(q)$ (4)

As evident from equation (3), A's private key is a function of its own private random number, a, and the public key, B. As it turns out, A and B arrive at the shared secret key based upon:

$k_a = B^a \mod(q)$ and $k_b = A^b \mod(q)$

Substituting for A and B using equations (1) and (2) above yields:

$k_a = (p^b \mod(q))^a \mod(q)$ and $k_b = (p^a \mod(q))^b \mod(q)$ $k_a = p^{ba} \mod(q)$ and $k_b = p^{ab} \mod(q)$ Therefore, $k_a = k_b$.

Using the Diffie-Hellman protocol, A and B each possesses the same secure key $k_a$, $k_b$, which can then be used to encrypt messages to each other. An eavesdropper who intercepts an encrypted message can recover it only by knowing the private values, a or b, or by solving an extremely difficult discrete logarithm to yield a or b. Thus, the Diffie-Hellman protocol provides a relatively secure approach.

Other approaches for key exchange that are suitable for use in embodiments of the present invention are disclosed in co-pending application Ser. No. 09/393,410, filed Sep. 10, 1999, and naming as inventor Sunil K. Srivastava, and entitled "OPERATIONAL OPTIMIZATION OF A SHARED SECRET DIFFIE-HELLMAN KEY EXCHANGE AMONG BROADCAST OR MULTICAST GROUPS," the entire disclosure of which is hereby incorporated by reference as if fully set forth herein, and in co-pending application Ser. No. 09/393,411, filed on Sep. 10, 1999, and naming as inventor Sunil K. Srivastava, and entitled "PROCESSING METHOD FOR KEY EXCHANGE AMONG BROADCAST OR MULTICAST GROUPS THAT PROVIDES A MORE EFFICIENT SUBSTITUTE FOR DIFFIE-HELLMAN KEY EXCHANGE," the entire disclosure of which is hereby incorporated by reference as if fully set forth herein. The approach of the first disclosure identified above is mathematically similar to conventional Diffie-Hellman, but operationally better, and the approach of the second disclosure is mathematically different but equivalent and operationally also better.

FIG. 4A shows a broadcast version of the Diffie-Hellman method involving three users A, B, C. Initially, each of the participants A, B, C randomly generates private integers, a, b, and c, respectively. Thereafter, they compute their public keys, as in step 402. These public keys are computed as follows. The operational optimizations described in the above-referenced patent application may also be used with these steps.

$A = p^a \mod(q)$ (5)

$B = p^b \mod(q)$ (6)

$C = p^c \mod(q)$ (7)

Next, in step 404, user A sends message $C' = C^a \mod(q)$ to user B. In turn, B transmits the message, $A' = A^b \mod(q)$ to C, as shown by step 406.

In step 408, user C sends A the message $B' = B^c \mod(q)$. As shown in step 410, the users are then able to arrive at a shared secret key, k, by computing:

A computes k: $k = B'^a \mod(q) = p^{abc} \mod(q)$ (8)

B computes k: $k = C'^b \mod(q) = p^{abc} \mod(q)$ (9)

C computes k: $k = A'^c \mod(q) = p^{abc} \mod(q)$ (10)

The method establishes a secure communication channel among users A, B, and C. Although three users are discussed in the above example, the Diffie-Hellman key-exchange method applies to any number of users.

FIG. 4B shows another public key exchange protocol that is based mathematically on the Diffie-Hellman method and that addresses multicast group membership two entities at a time. An entity may comprise one or more nodes. In this example, a multicast group comprises users A, B, C, D of the network of FIG. 1. Initially, assume that users A, B use workstations 103, 105 to establish a common shared key to securely communicate between themselves. Conceptually, users A, B form a single entity 441 and a subsequent user or node seeking to join the multicast group effectively views the previously formed multicast group as a single unit. Hence, users A, B are treated as one entity with respect to arriving at a new shared secret key with a new group member. Only one user, A or B, needs to communicate with the new multicast group member, user C. In the preferred embodiment, the user who last joins the multicast group is designated as the node that relays the group's information to the new user.

The current multicast group or entity 441 has two users A, B. B is the designated node, because B can be considered as having joined with A. Alternatively, the designated node can be determined according to physical proximity to the new node, or other metrics such as telecommunication cost, reliability, link utilization, etc. Once entity 441 and user C arrive at a new shared secret key, they form a new entity 443, constituting a new multicast group that subsumes multicast group 441.

If user D wishes to join the multicast group, only one of the users among A, B, C needs to share the group's public value with user D. Because user C was the last member to join, it forwards the group's public value to user D, who may then compute the shared secret key. The foregoing binary approach of determining a shared secret key between two entities at a time, as further described with respect to FIG. 4C and FIG. 4D, results in a greatly reduced number of messages exchanged among the group members over the standard broadcast Diffie-Hellman approach.

Figure 4C:
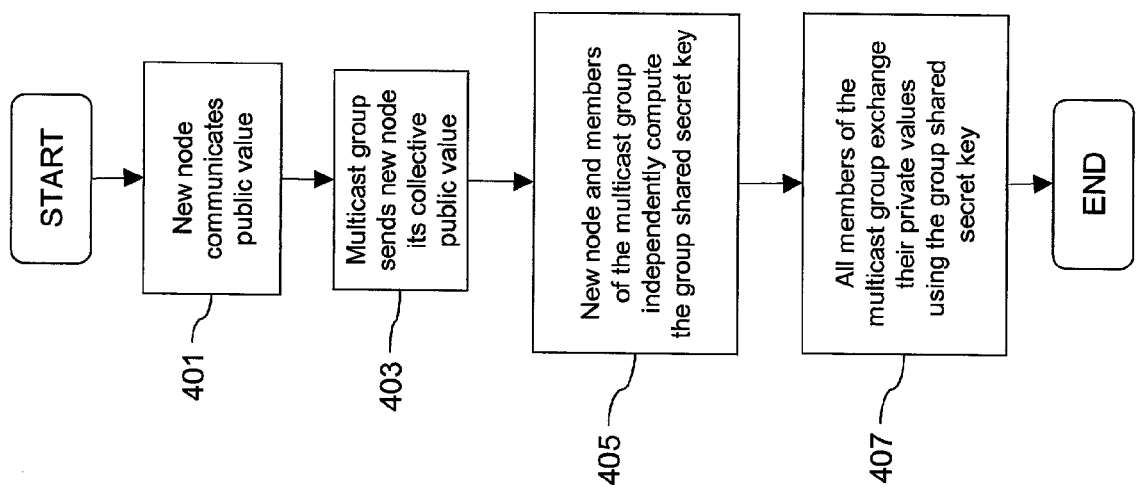

FIG. 4C is a flow diagram showing a method of carrying out the binary approach. The method assumes that a multicast group of one or more nodes or users is in existence. If two or more nodes make up the multicast group, the method further assumes that the group is communicating over a secure channel such that each member of the multicast group possesses or has knowledge of the group shared secret key.

In step 401, a new node that wishes to join the existing multicast group communicates the new node's public value to the multicast group. In an exemplary embodiment, step 401 is carried out by a directory that stores the public value for ready access by the members of the multicast group.

In step 403, the multicast group sends the new node the collective public value of the multicast group. The computation of this public value is more fully discussed below with respect to FIG. 4D. Based upon each other's public key, the new node and the multicast group members independently compute a new group shared secret key, as shown by step 405. With this new group shared secret key, all members of the new multicast group can exchange their private values, as shown by step 407. Accordingly, secure communication can be achieved.

FIG. 4D shows a key exchange protocol to arrive at a shared secret key in a context involving four nodes or users A, B, C, D. In step 411, A and B compute a shared secret key, $k=p^{ab} \bmod(q)$, thereby forming entity 441 in a manner similar to the standard two party Diffie-Hellman method. A and B each publishes its respective public key ($A=p^a \bmod(q)$ and $B=p^b \bmod(q)$). User A obtains B's public key to compute $B^a \bmod(q)$, which equals $p^{ab} \bmod(q)$; user B performs a similar computation based on A's public key.

Once A and B have reached a shared secret key, they exchange their private numbers, a and b. Numbers a and b are randomly generated integers and are embedded in messages that are sent by users A and B to each other. These messages can be signed by the sending node using a private key that differs from the sending node's private number. In one embodiment, the private key may be a permanent private key. By using separate private keys, the multicast group obtains an additional level of security.

Assume that currently, the multicast group includes users A and B; however, user C has a message to send to both A and B. As a result C seeks to join the multicast group. In step 413, user C communicates its public value, $C=p^c \bmod(q)$, to the other users, A and B, within the established multicast group. Next, as shown in step 415, a public key value, AB, determined by users A and B, is sent to user C by either A or B.

$$AB=k_{ab}{}^{ab} \bmod(q)=p^{(ab)(ab)} \bmod(q) \quad (11)$$

According to Equation (11), the private number of the formed entity or multicast group, AB, is the product of the individual private numbers a and b, raised to a power that is a function of the number of nodes within the formed entity. Thus, the private value of AB is $(ab)^2$.

In the preferred embodiment, the last member to join the group has responsibility of transferring the collective public key value to a subsequent "joining" node. Thus, user B transmits public key AB to C. At the time of joining the multicast group, new member C has knowledge of only one entity, which may be one or more nodes; in this example, A and B form one entity. A and B independently compute the shared secret in step 417, using Equation 12:

$$k_{abc}=C^{(ab)(ab)} \bmod(q)=p^{(ab)(ab)c} \bmod(q)=p^{(ab**2)c} \bmod(q) \quad (12)$$

A and B are able to compute the shared secret key because they know each other's randomly generated private numbers a and b. This computation, operationally, can be accomplished by tracking the number of times each of the nodes has undergone multicast membership joins. In this instance, A and B have been involved with multicast joins twice, while user C has done so only once.

User C computes the group shared secret key as follows:

$$k^{abc}=(AB)^c \bmod(q)=p^{(ab)(ab)c} \bmod(q)=p^{(ab**2)c} \bmod(q) \quad (13)$$

Now that a group shared secret key has been computed by all the members of the "new" multicast group, the members exchange their private values to begin communicating over a secure channel, as shown in step 419.

Assume that another user D now wants to communicate with all the users of the multicast group. User D communicates its public value, $D (=p^d \bmod(q))$ to the multicast group, as shown by step 421. In step 423, the multicast group transfers an agreed upon collective public value, ABC, to D. According to one embodiment, C is designated as the member to convey value, ABC, to user D, and the value ABC is:

$$ABC=k_{abc}{}^{abc} \bmod(q)=p^{(((ab)(ab)c)(abc))} \bmod(q)=p^{(ab3)(c2)} \bmod q \quad (14)$$

Based on Equation (14), the private value for the multicast group is $(ab)^3(c^2)$. Thus, the multicast group private value is the product of the private values of the nodes raised to the number of times each node has been in group formations. This is advantageous because the collective public key can be derived by having each node track the number of times it has participated in multicast group formation. With this information, in step 425 the user D, as the new node, can compute a new group shared secret key, $k_{abcd}$:

$$k_{abcd}=(ABC)^d \bmod(q)=p^{(((ab)(ab)c)(abc))d} \bmod(q)=p^{(ab3)(c2)d} \bmod(q) \quad (15)$$

Likewise, the other members A, B, C of the multicast group calculate the new group shared secret key.

In the preferred embodiment, the processes shown in FIG. 4A, FIG. 4B, FIG. 4C, FIG. 4D may be implemented as one or more computer-executed instructions, processes, programs, subroutines, functions, or their equivalents. In an embodiment, each workstation 103, 105, 107, 109 is a general-purpose computer of the type shown in FIG. 8 and described herein in connection with FIG. 4A, FIG. 4B, FIG. 4C, FIG. 4D. The cryptographic devices 103*a*, 105*a* and the key generators 103*b*, 105*b* are one or more computer-executed instructions, processes, programs, subroutines, functions, or their equivalents. Further, embodiments may be implemented as discrete hardware circuitry, a plurality of computer instructions (computer software), or a combination of discrete hardware circuitry and computer instructions.

Once a distributed group controller or MKDC of FIG. 2A, FIG. 2B, FIG. 2C has established secure communication using any one of the key exchange methods, the distributed group controller may efficiently disseminate and maintain the group session keys for the members of the multicast group of users A-H.

Binary Tree Approach for Distributing Group Controller Keys

A binary tree approach is disclosed in co-pending application Ser. No. 09/407,785, entitled "METHOD AND APPARATUS FOR CREATING A SECURE COMMUNICATION CHANNEL AMONG MULTIPLE PROXY MULTICAST SERVICE NODES," filed Sep. 29, 1999, and naming as inventors Sunil K. Srivastava et al. and in U.S. Ser. No. 09/470,334, filed Dec. 22, 1999, for "METHOD AND APPARATUS FOR DISTRIBUTING AND UPDATING GROUP CONTROLLERS OVER A WIDE AREA NETWORK USING A TREE STRUCTURE," naming as inventor Sunil K. Srivastava, the entire disclosures of which are hereby incorporated by reference as if fully set forth herein.

The binary tree approaches described therein makes it possible to scale a secure communication system to large multicast groups, with less overhead involved in transmission of new group session keys when members join in a multicast group. Advantageously, each affected member does only $\log_2 N$ decryption operations; further, when a member joins or leaves, the central group controller, which acts as a group membership coordinator, sends only a subset of keys to existing group members on an affected tree branch. All keys that are affected can be sent, ideally, in one multicast or broadcast message, and only keys that correspond to a particular node will be decrypted by that node.

Further, in this approach each node member only holds $\log_2 N$ keys and a group session key. For each join, a new member gets $\log_2 N$ keys, where the first key is unique to a node. The first key also is like a private key because only the node member and a CA or KDC can know it. When a node sends a join request to a group controller, after authentication and validation, a signed and encrypted payload is sent to the joining member. The second key is encrypted with the first key and the third key is encrypted with the second key and so on, until the group key is encrypted with the last key. Only one key out of $\log_2 N$ keys are unique to a node and the rest are shared with other node members. The other keys are shared with other node members and are obtained from intermediate nodes of a binary tree, in which leaf nodes represent the node members having private keys.

The group controller can send the new group key and the new affected shared keys in one broadcast message, the size of which is $2 \log_2 N-1$ keys. As an optimization, it can send a broadcast message saying that nodes should hash forward keys and group keys based on an agreed hashing process, or it can send one broadcast message with $2 \log_2 N$ keys, or send $2 \log_2 N$ key messages in point to point messages, each message containing one key. For a leave operation, similar key update messages are sent.

One issue with this approach, however, is that the central group controller presents a single point of failure. The KDC and CA also present a single point of failure in approaches that do not use a binary tree mechanism. An approach for avoiding a single point of failure is presented in the co-pending application U.S. Ser. No. 09/408,420, filed Sep. 29, 1999, for "METHOD FOR OVERCOMING THE SINGLE POINT OF FAILURE OF THE CENTRAL GROUP CONTROLLER IN A BINARY TREE GROUP KEY EXCHANGE APPROACH," and also in co-pending application Ser. No. 09/470,054, filed Dec. 22, 1999, entitled "METHOD AND APPARATUS FOR DISTRIBUTING AND UPDATING PRIVATE KEYS OF MULTICAST GROUP MANAGERS USING DIRECTORY REPLICATION," naming as inventors Sunil K. Srivastava et al., the entire disclosures of which are hereby incorporated by reference as if fully set forth herein.

The approach of the first application referenced above is well suited to distribution over a LAN, and the approach of the second application referenced above is well suited for use over a WAN. According to the present approach, a tree structure is used. In the tree structure, the MKDC can be implemented as a group controller that is joined with other MKDCs in the tree to enable communication of keys among them. This arrangement enables secure communications between the MKDCs.

Figure 5:
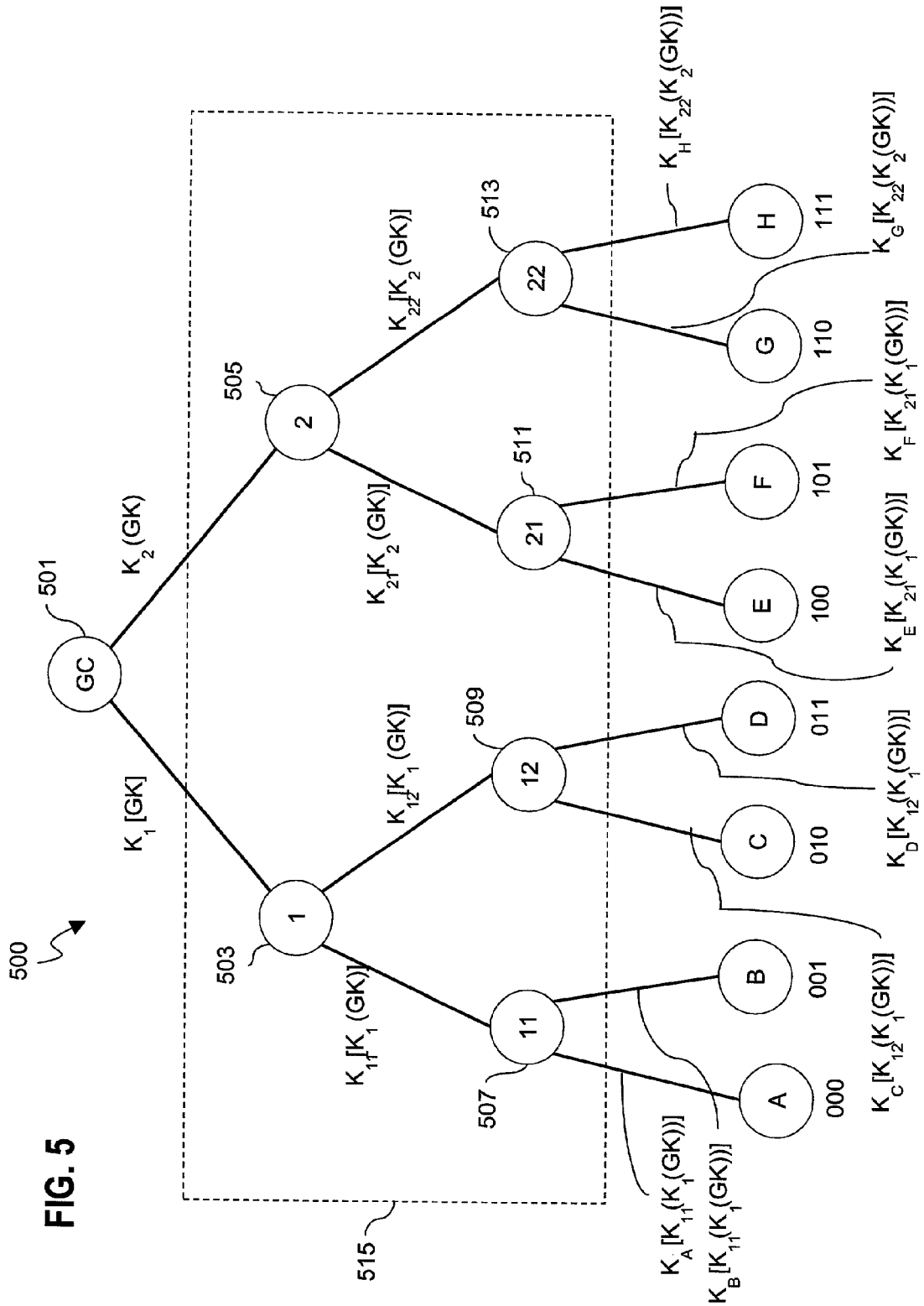
FIG. 5 is a diagram of a binary tree approach to key management used in the systems of FIG. 2A, FIG. 2B, and FIG. 2C.

FIG. 5 shows a binary tree structure for key management among a multicast group. In the binary tree approach, users, clients or nodes of a multicast group are mapped to leaf nodes of a binary tree 500. Root node 501 represents the distributed group controller 111 of FIG. 1. In one embodiment, leaf nodes are associated with users A-H. Each leaf node forms a point-to-point secure channel with group controller 501 who participate in a multicast group. Thus, intermediate nodes 515 are not true nodes and are not associated with software or hardware elements of a network, but rather serve to conceptually illustrate how each leaf obtains the group session key (GK).

Group controller node 501 has the responsibility of encrypting $2 \log_2 N+1$ keys and sending the keys to nodes A-H via a multicast message. The actual messages that are transmitted by group controller 501 contain, for example, information about the key's identification, revision, and version. Alternatively, group controller node 501 may send $2 \log_2 N+1$ messages to each group member individually. Each leaf node A-H stores $\log_2 N$ keys, in which one of the keys is the particular node's private key and the remaining keys are shared among some of the other nodes.

Labels along the branches of binary tree 500 show how the group key GK is encoded for each member of the multicast group. The group key undergoes successive encryption by the private keys of nodes of all branches.

For example, for the branch comprising nodes 501, 503, 507 and user A, group key GK is first encrypted using the private key, $K_1$, of node 503. These keys are then encrypted using the private key, $K_{11}$, of node 507. The private key of user A encrypts these keys. Thus, group controller 501 sends, to user A, the last encrypted message, $K_A[K_{11}(K_1(GK))]$. When user A receives this encrypted message, it decrypts using its private key and utilizes the corresponding shared keys until the group key is determined. Under this arrangement, no one leaf has knowledge of all the shared keys, thereby providing an extra level of security. For convenience, the foregoing approach will be referred to as the Standard Binary Tree Description in this document.

Intermediate nodes 515 of the binary tree 500 represent actual multicast group members. This arrangement more naturally accommodates superimposition of multicast routing trees, reliable multicasting transport trees, hierarchical cache chaining structures, and directory trees. Using intermediate nodes 515, the number of group members and keys is $2^{N+1}-1$, and each group member stores $\log_2 n$ keys, where n defines the level in a tree, ranging from 0 to N, and N is the number of nodes in the tree. In contrast, an embodiment that employs only leaves of the binary tree 500 accommodates N nodes and $2^{N+1}-1$ total keys, in which each node has $\log_2 N$ keys.

Under this approach, there is flexibility in implementation with regard to joining and leaving the multicast group. The number of keys affected is essentially $2 \log_2 N-2 \log_2 n$. In the first option, the intermediate node, for example node 503, behaves as a group controller for its branch by changing the keys of the affected nodes within its branch. This first option reduces the workload on the group controller 501. As a second option, the intermediate node 503 requests a new session key from the group controller 501 or requests permission to create a new session key.

In the case where the group controller 501 creates a new group session key, the group controller 501 encrypts the new session key with the private key of the intermediate node 503. However, if the group session key results from a member leaving the multicast group, the intermediate node 503 changes its key(s) since such keys were known by the leaving node. To do so, the intermediate node has a separate secured private channel with the group controller 501. Using this private channel, the intermediate node sends the group controller 501 its updated keys. Alternatively, the intermediate node (which is acting as a sub-group controller) decrypts the group session key from the group controller 501 and then encrypts the group session key with the newly created keys associated with the affected nodes.

In yet another embodiment of the binary tree method, the private keys of the nodes can be made to correspond to an address identification. Assuming that there is an address space of $2^N$ member nodes, each member is identified by a word of N bits in length. For example, users A-H are assigned 000-111, respectively. Further, each bit in the address ID can be considered to correspond to a private key, and the total number of keys is 2N.

In one embodiment, address IDs can be hierarchically assigned, in which the most significant bits (MSBs) represent node members closer to the root node and group controller. When a node joins the multicast group, group controller 501 distributes N keys, corresponding to bit values of the joining node, by embedding these keys in the address identifier of the new node after version incrementing it. In the case where the node leaves the group, the group controller 501 communicates a new group session key encrypted in the remaining N keys that were unaffected by the node leaving. The group controller 501 also broadcasts the new version of the affected N keys encrypted in the new group key and the old set of N keys.

An IP address and time coordinates of a directory node may be used to derive a unique address identifier for a node that is joining a multicast group. However, this does not result in a contiguous sequence or address space of the identifiers. To obtain identifiers that are within a contiguous address space, the identifiers may be issued by a central registration authority or appropriately hashed. Directory replication can be utilized to implement a distributed MKDC, as shown in FIG. 2B and FIG. 2C. According to an embodiment, an X.500 directory or LDAP directory operates as a mechanism for key distribution and provides a logical infrastructure for the tree approach described above. Such directory mechanisms inherently include a replication capability. When directory replication is carried out, a copy of the directory database is automatically distributed to and stored in a different logical domain. Nodes within the different logical domain can access a local replica of the directory for needed information, rather than sending a request for service across the network.

In this configuration, a MKDC and MSA for a domain from which a publisher is publishing events may use directory replication to store and distribute ID-based keys. The directory provides a repository of all versions of private keys for each MDCS and each MSA node. Using these keys, private secured channels are built using a primary group controller or group controller using the mechanisms described herein. The group controller stores the same set of keys and version information. Communication between group controllers includes version information in headers. Keys may be synchronized using the version information. A new group session key may be generated by a particular MKDC and MSA acting as a master group controller. Thus, when a new group session key is generated, it can be stored only in the local domain. Directory replication then occurs, and thereafter, an MKDC can obtain a common group session key from a local copy of the directory. Normally, the MSA and MKDC will not start up or shut down (come up and down) very often. Therefore, the frequency of updates is low, and at the time of an update, a large number or block of keys for various versions can be distributed using directory replication.

Figure 6A:
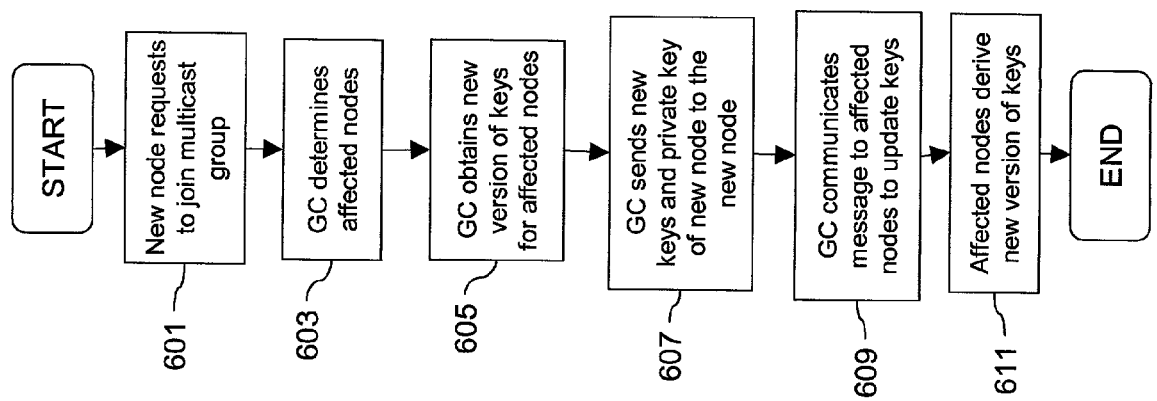
FIG. 6A and FIG. 6B are a flow chart and a diagram, respectively, of an exemplary embodiment of the operation of the group controller of FIG. 2A, FIG. 2B, FIG. 2C related to joining of the multicast group.

FIG. 6A is a flow chart that shows a process of a node joining a multicast group according to the binary tree algorithm of FIG. 5. In relation to FIG. 5, joining the multicast group means assuming a leaf position on the binary tree 500 or creating and storing a new node at the level of leaf nodes A-H. Because the shared keys along a branch with the new leaf are required to be updated, all nodes along that particular branch are affected by the addition.

As shown by step 601, a node that desires to be a part of the multicast group first sends a join request to the group controller 501. The join request may comprise an IGMP join message. The group controller 501 determines which nodes are affected by the join, as shown by step 603. The group controller 501 generates new versions of the keys for the affected nodes, as shown by step 605.

In step 607, group controller 501 sends these new versions of the shared keys and a unique private key to the new joining node. In step 609 the group controller 501 transmits a message to the affected nodes, instructing the nodes to update their keys by changing the revision numbers. Each of the affected nodes, in response to the message, derives a new version of its keys, as shown by step 611. In the preferred embodiment, each affected node performs a one-way hash to compute the new version of the keys. Such an approach permits the generation of unique keys to be synchronized between the member nodes and the group controller without having to transmit the actual keys, thereby reducing the probability of security leaks.

Figure 6B:
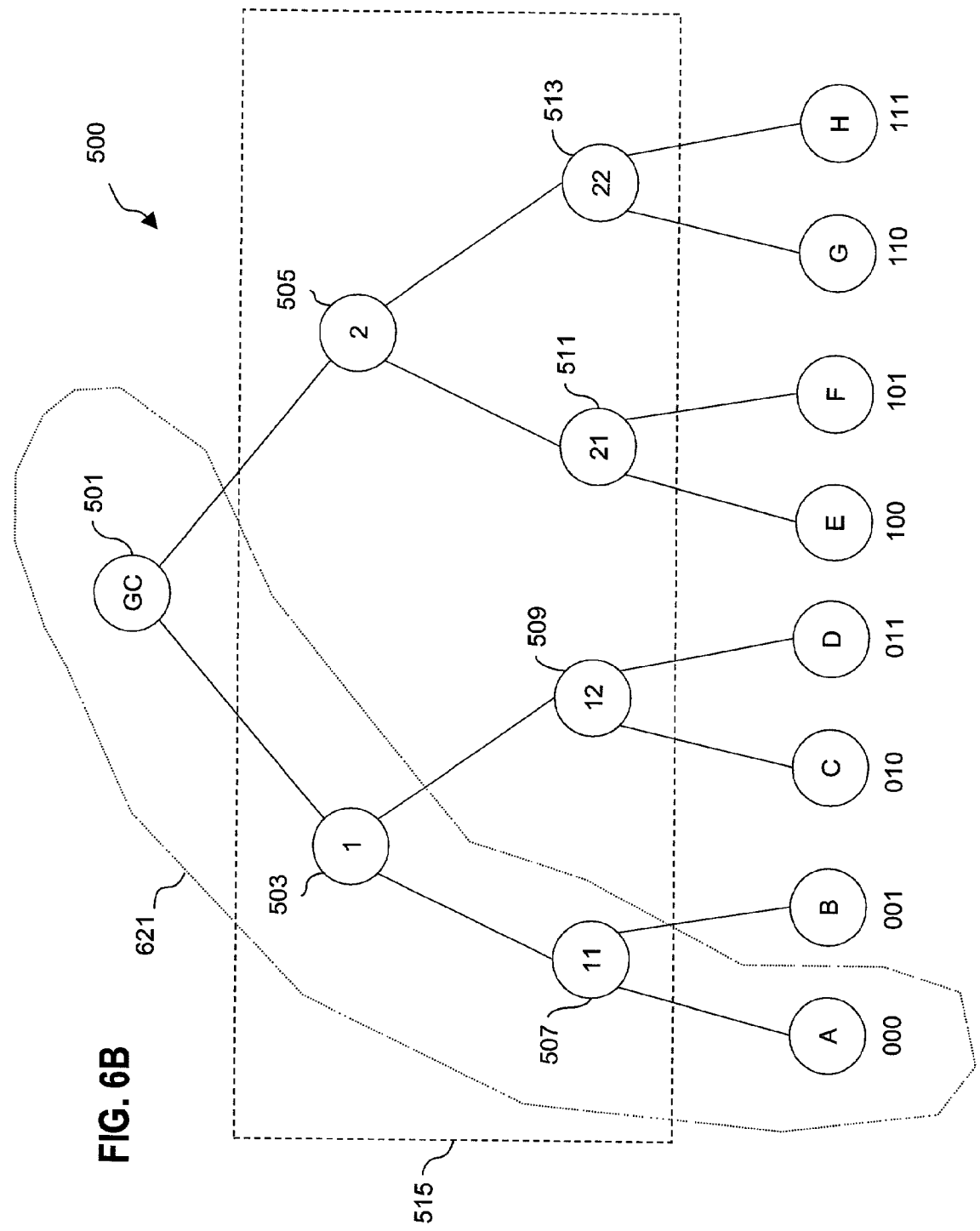

FIG. 6B provides an illustration of a user joining the multicast group. In this example, user A, who seeks to join, sends a request message to group controller 501 over an unsecured channel. Because user A belongs in the left branch 621 of the binary tree 500, the affected nodes in this instance are nodes 503, 507. These nodes are required to update their keys by performing a one-way hash function on the current version of their keys when instructed by group controller 501. The group controller 501 transmits the shared keys of the nodes along branch 621 to user A along with user A's private key. Thus, user A is able to derive the group session key and securely communicate with the other members of the multicast group. The group controller 501 is also responsible for managing the keys when a node leaves the multicast group.

Figure 7A:
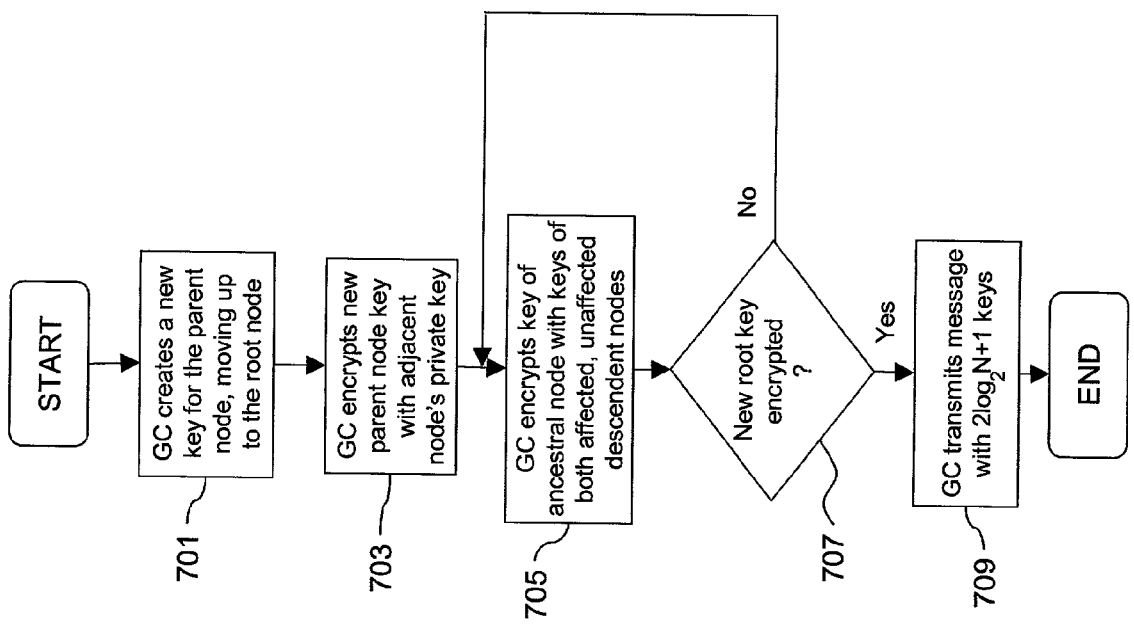
FIG. 7A and FIG. 7B are a flow chart and a diagram, respectively, of an exemplary embodiment of the operation of a group controller of FIG. 2A, FIG. 2B, FIG. 2C related to leaving the multicast group.

FIG. 7A is a flow chart that shows a process of managing keys within the multicast group when a group member leaves. In this case, all the keys known to the "leaving" node are version controlled to prevent such user from intercepting future messages exchanged among the multicast group, resulting in forward security.

In step 701, group controller 501 generates a new key for the parent of the leaving node as well as all ancestral nodes until the root node is reached. The group controller 501 also creates new keys for the sub-branches hanging off from the sub-nodes that fall on the path from the departed node to the root node. In particular, the group controller 501 encrypts a new key of the parent node with the adjacent node's private key, as shown by step 703.

The key of the immediate ancestral node (which in this instance is the grandparent of the leaving node) is encrypted with the keys of both affected and unaffected descendent nodes, as indicated by step 705. The group controller 501 then determines whether the new root key has been encrypted, as shown by step 707. If the root key has not been encrypted, then step 705 is repeated until the root key is encrypted with its two child nodes. In fact, once the root node has been updated, all the keys are transferred to each of the users of the affected branch 720 in one message containing 2 $\log_2$ N+1 keys.

Figure 7B:
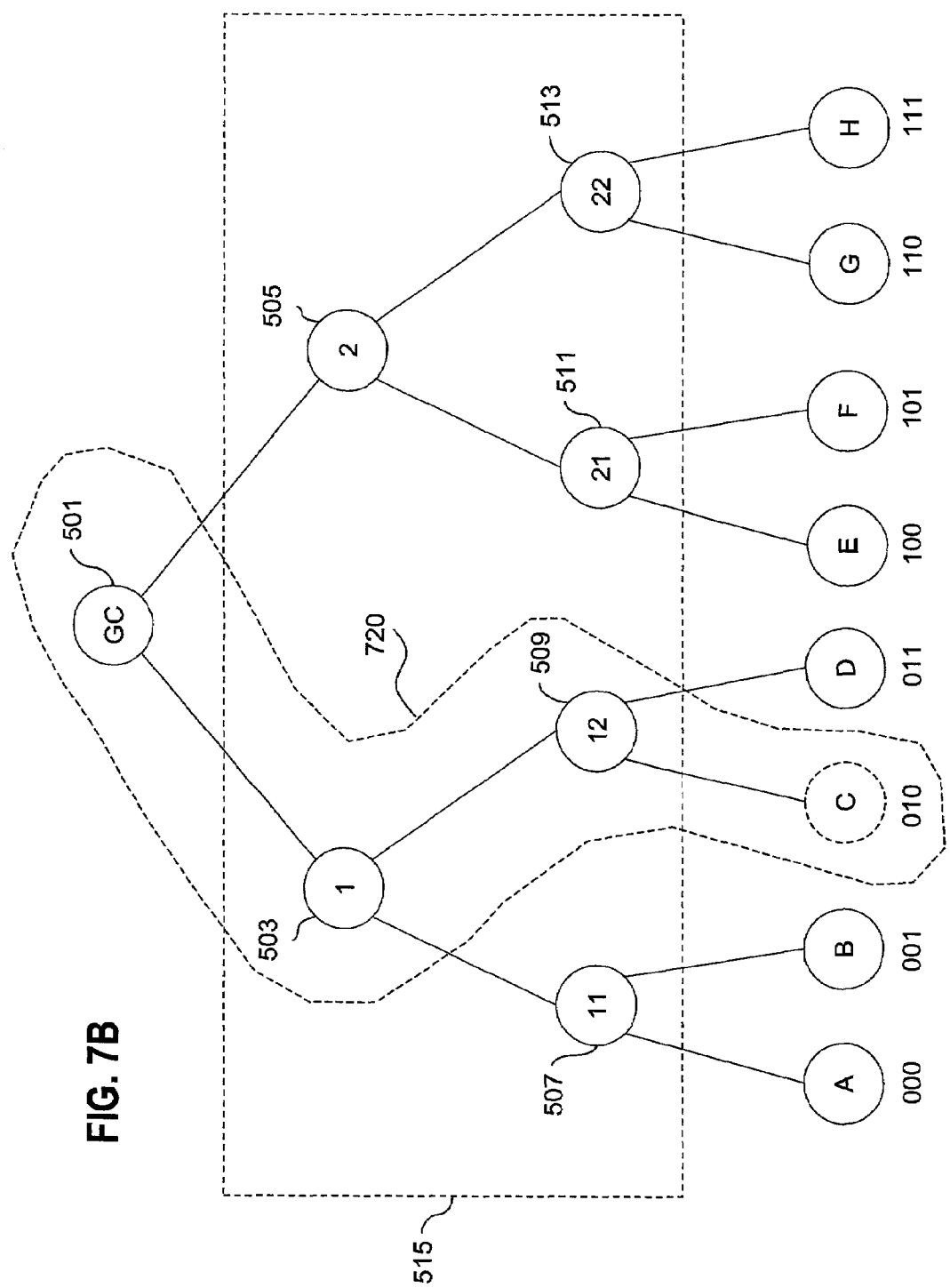

FIG. 7B is a diagram that illustrates the process of FIG. 7A in an example case in which user C terminates its membership in the multicast group. As described above, group controller 501 creates a new key for each ancestral node along the path 720 of the leaving node; i.e., node 509 of user C, a new key for the grandparent node 503, and a new group session key.

Accordingly, a directory may be used as infrastructure to build secure communications among a plurality of MKDCs. Each address has two keys for each bit in the address value. If the value of a particular bit is 1, then the first key is used, otherwise the second key is used. All nodes have overlapping keys and no single node has all keys. An administrator can determine a group session key, update one directory domain with the group session key, and directory replication then causes the keys to be replicated. As a result, keys become locally available to all nodes that need them.

Distribution of Group Managers Over a Wide Area Network Using a Tree Approach

Figure 10A:
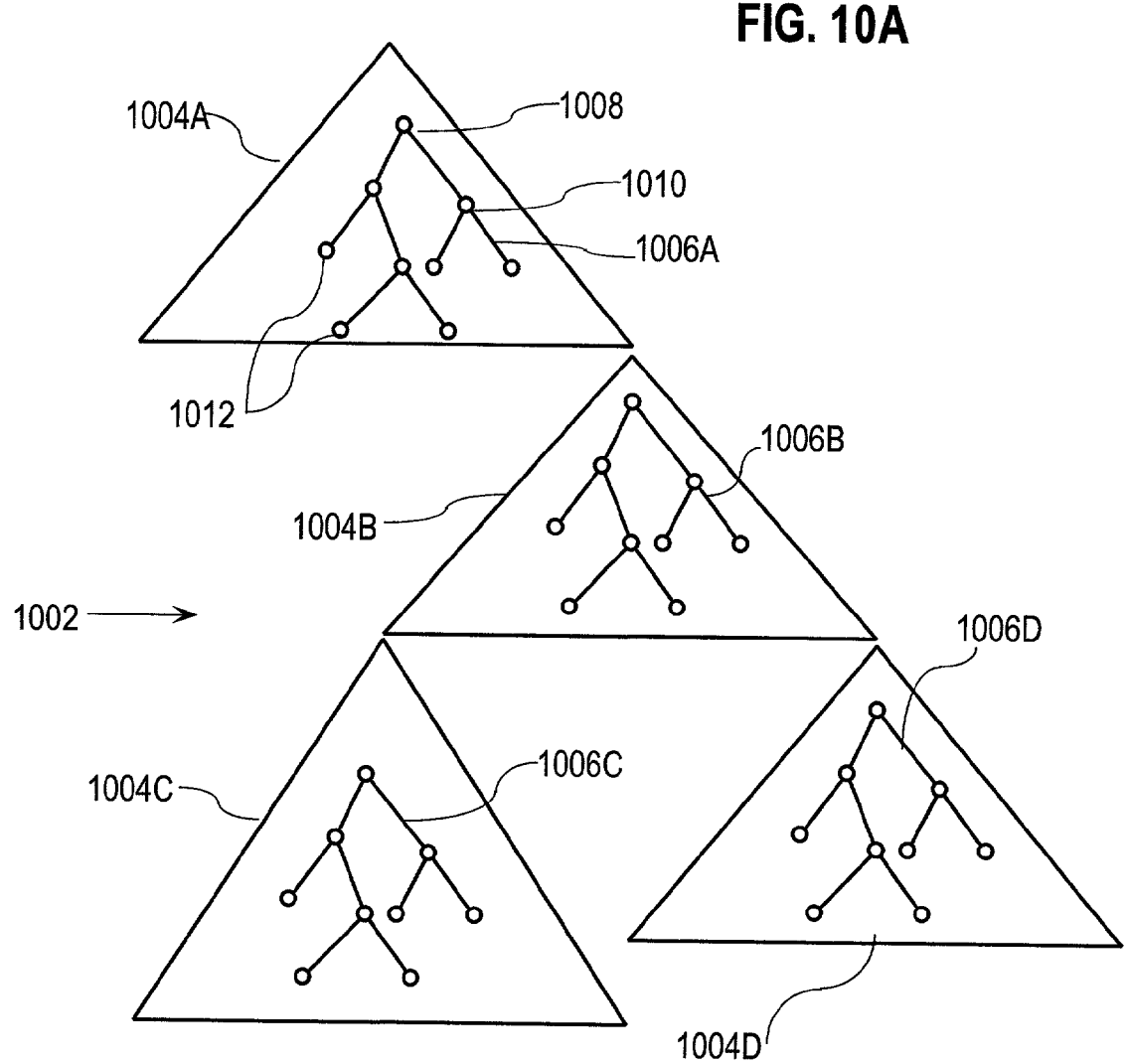
FIG. 10A is a diagram of distribution of group controllers over a WAN using a tree structure.

FIG. 10A is a diagram of distribution of multicast group controllers over a WAN using a tree approach. Such distribution is accomplished, in part, by taking advantage of the tree-like structure that is provided by the arrangement of domains in a directory service or directory server system.

In an embodiment, directory system 1002 comprises a plurality of directory servers, each of which is responsible for directory services for one of a plurality of domains 1004A, 1004B, 1004C, 1004D, etc. Each domain 1004A, 1004B, 1004C, 1004D, etc., contains one or more servers, network devices, and end stations. Information about the devices in a domain is stored in a directory server associated with that domain. Domains may be distributed across wide geographic regions. For example, domains may span regions within a building, multiple buildings of a campus, or multiple buildings located in different cities around the world. Such domains may be spread over a wide area network. There may be any number of domains, and four (4) domains are shown in FIG. 10A merely as an example.

As shown in FIG. 10A, domains can be conceptualized as organized in a tree, as indicated by the tree-like arrangement of domains 1004A, 1004B, 1004C, 1004D in FIG. 10A.

Each domain also comprises a binary tree 1006A, 1006B, 1006C, 1006D that represents members of a multicast group that are located in that domain. Each binary tree comprises a root node 1008, one or more intermediate nodes 1010, and one or more leaf nodes 1012. In the binary tree approach described above with reference to FIG. 5 through FIG. 7B, inclusive, intermediate nodes are hypothetical nodes that do not literally correspond to member nodes of a multicast group. In the present embodiment, each member of a multicast group is given an identifier value that corresponds to and identifies a node of the binary tree. Accordingly, the amount of database storage needed is reduced. Further, the number of messages that are needed to update all affected keys, including the group session key, is reduced.

Figure 10B:
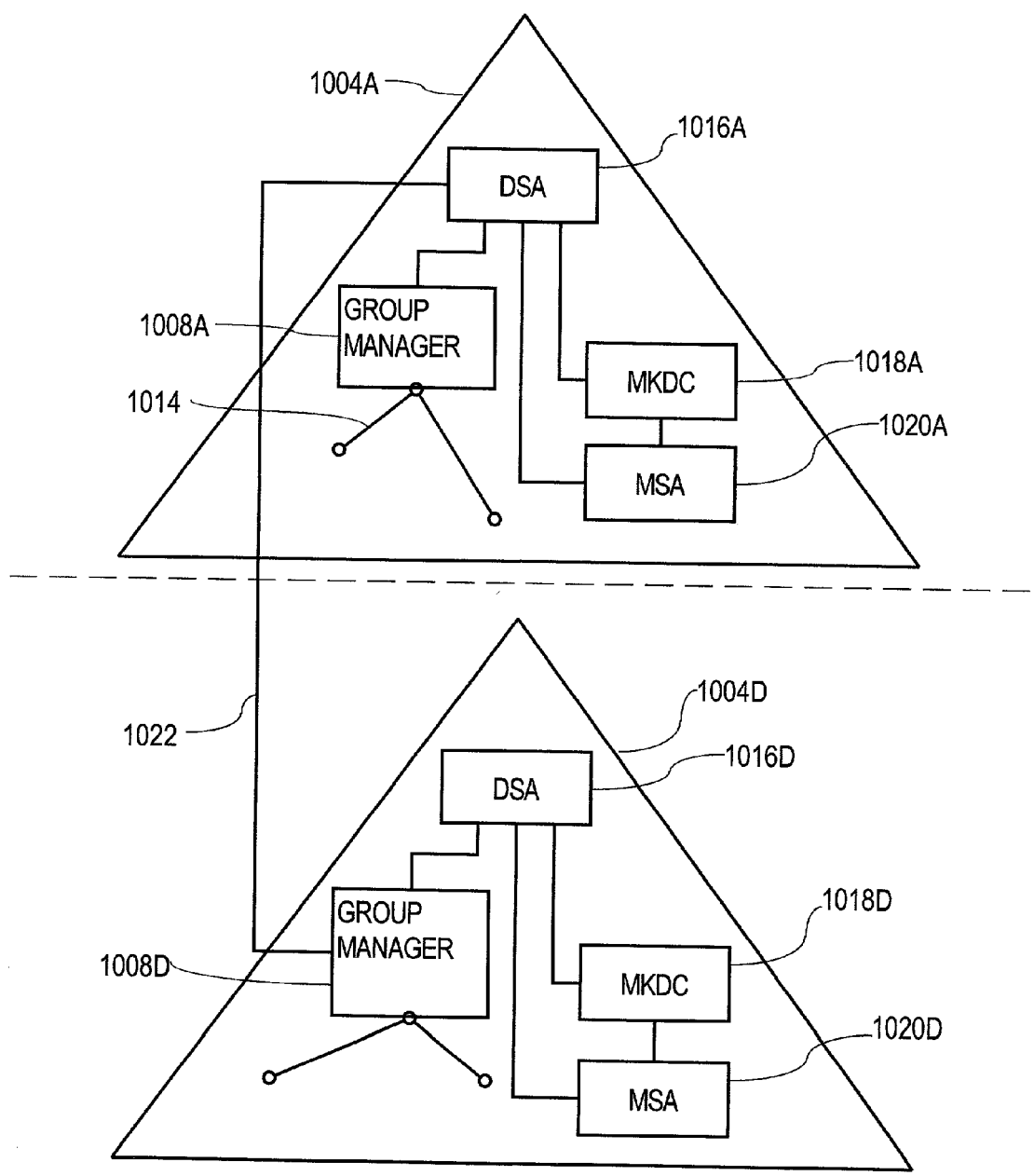
FIG. 10B is a diagram of the internal structure of elements in a domain of FIG. 10A.

FIG. 10B is a diagram of the internal structure of elements in a directory domain that provide for key distribution in a secure communication system. In FIG. 10B, elements of two exemplary domains 1004A, 1004D are shown. Each domain has the same elements.

For example, domain 1004A comprises a Group Manager 1008A that corresponds to root node 1008 of binary tree 1006A and has child nodes 1014. The child nodes 1014 may comprise both intermediate nodes 1010 and leaf nodes 1012. Each domain also comprises a Directory Service Agent (DSA) 1016 that may communicate with Group Manager 1008A, and an MKDC 1018A and an MSA 1020A that may communicate with DSA 1016A. Each local Group Manager is used by event publishers within its domain. Thus, Group Manager 1008A is used by event publishers within directory domain 1004A.

Figure 10C:
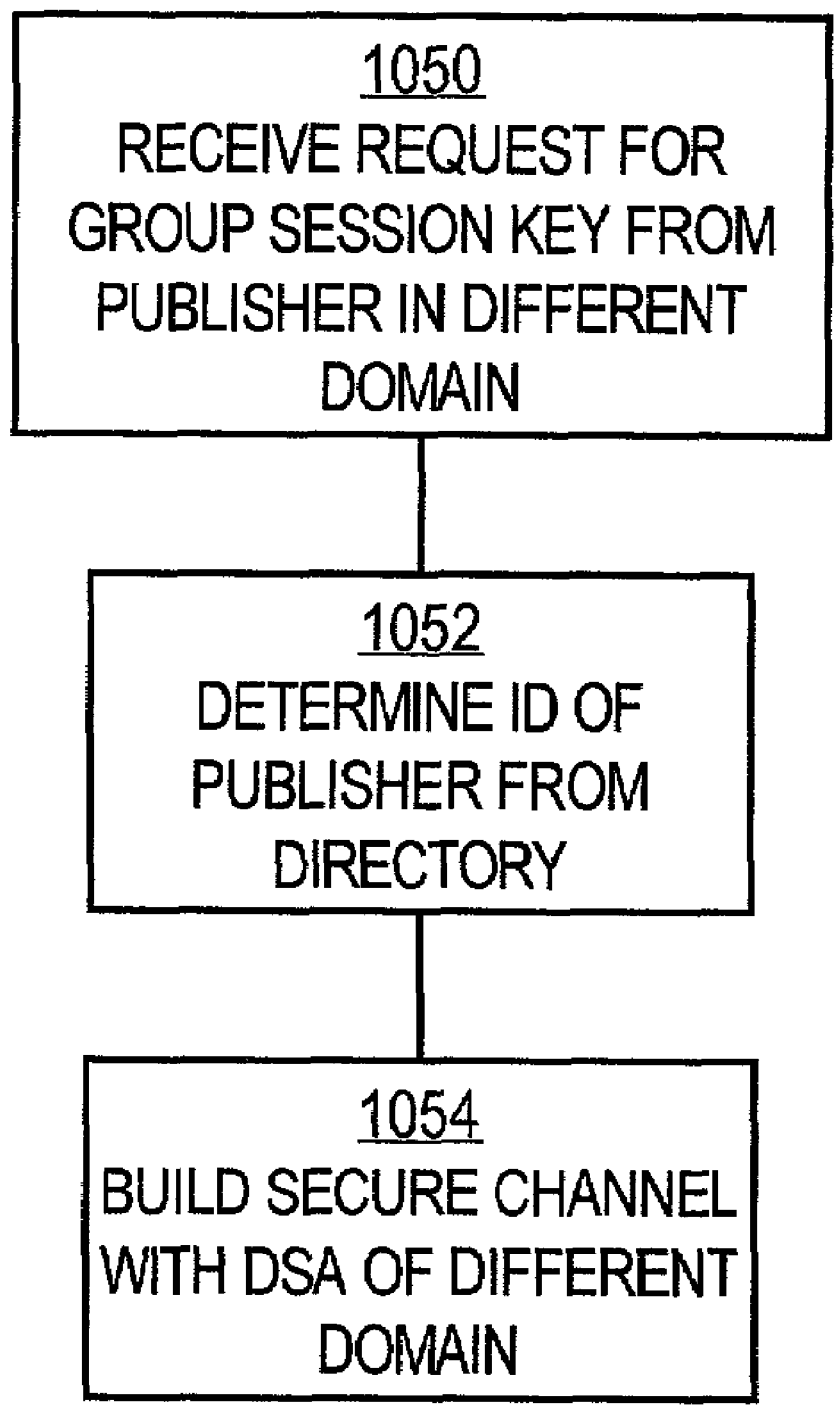
FIG. 10C is a flow diagram of processing steps carried out to obtain ID information about a publisher node.

FIG. 10C is a flow diagram of processing steps carried out to obtain ID information about a publisher node that is located in another domain.

In block 1050, a local MKDC and MSA of a first domain receives a request for a group session key for an event published by a publisher in a different domain. In response, the local MKDC and MSA determines the ID of that publisher from the directory, as shown in block 1052. Using the ID value, the local MKDC and MSA build a secure channel with the root DSA, as shown by block 1054. The secure channel may be a point to point channel or a Multicast channel in which messages are sent in a broadcast fashion.

Figure 10D:
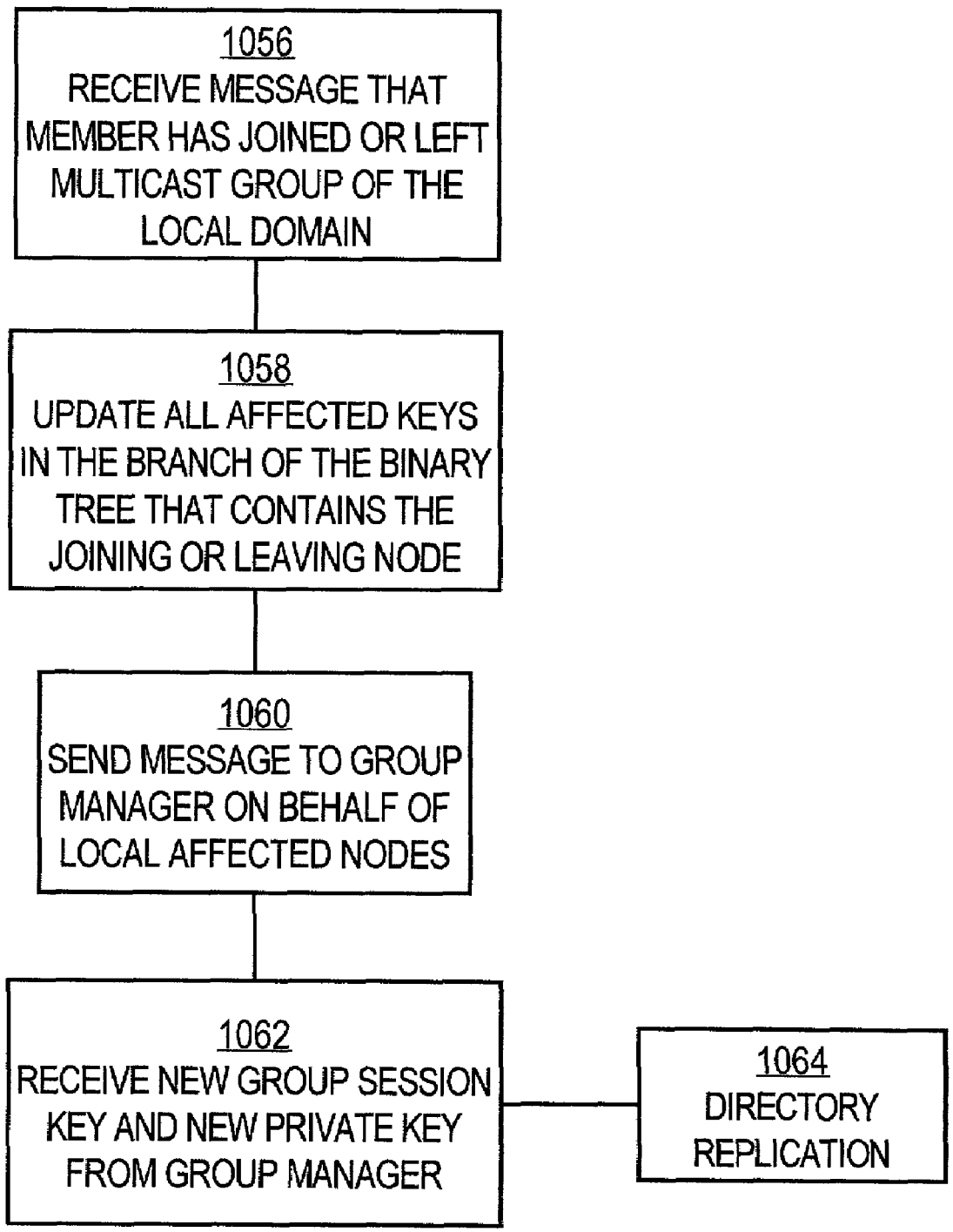
FIG. 10D is a flow diagram of a process that is carried out when a node joins or leaves a Multicast group.

FIG. 10D is a flow diagram of a process that is carried out when a node joins or leaves a Multicast group.

In an embodiment, each ID of a Multicast group node member has N bits. Thus, each binary tree 1004A, 1004B, 1004C, 1004D, etc., may have a maximum of $2^{N-1}$ nodes. Each Multicast group node member has a database of 2N+1 keys. When a node joins, it retains one key in its database as a private key, and the rest of the keys in its database are shared with nodes of other corresponding members in the joining node's branch of the binary tree. When a join occurs, all such keys must be updated along with the group session key.

Referring now to FIG. 10D, in block 1056, a local MKDC and MSA receives a message that a member node is joining or leaving a Multicast group. In response, as shown in block 1058, the local MKDC and MSA updates all affected keys that are on the same branch of the directory tree. The specific mechanisms are described above in connection with FIG. 5 through FIG. 7B. The group session key and the private key of the member are not updated because they are known to the root Group Manager. Instead, as shown in block 1060, the local MKDC and MSA send a message to the root Group Manager on behalf of the local affected nodes. In response, the root Group Manager communicates a new group session key based on the old, unaffected private keys. The MKDC and MSA receive the new private key and the new group session key from the Group Manager, as shown by block 1062. Advantageously, the local MKDC and MSA do not have to independently request a new private key, thereby reducing overhead. Also advantageously, the size of the update message is smaller and fewer keys are affected at the root Group Manager.

Keys corresponding to addition and deletion of group nodes only affect neighboring nodes in a sub-branch of the tree, as described above. Accordingly, intermediate nodes can act like a local Group Manager. This is practical because the local MKDC and MSA for a particular domain are not expected to come up and down as often as other Multicast nodes.

Thus, the Multicast GC's, MKDC, MSA nodes form a group among themselves and use directory replication to distribute group session keys and sub keys for the ID-based binary tree. A first binary tree may be used for secure back channel communication. A second tree comprises many real nodes in that are also part of the first tree, and the intermediate nodes in the second tree act like a local group controller to spread other group controller nodes over a WAN. An advantage of this approach, in which intermediate nodes act as a local group controller, is that the tree keys affected are local and the only global keys affected are the local group controller's private key and the group session key. The local group controller can change its private key and update all group controllers using the private channel. The group session key can be also be changed and other group controllers can be made aware of the change. Or, a "back channel" can be used to request the root group controller to update the private session group key.

In one alternative embodiment, directory replication is used to replicate versions of keys from a group manager associated with a publisher to a group manager associated with a parent node of the publisher, as shown by block 1064. Alternatively, private keys of group managers are updated in real time from the parent MKDC and MSA or group manager node.

As a result, the directory tree structure is exploited to provide scalability of Group Managers over a WAN.

Hardware Overview

Figure 8:
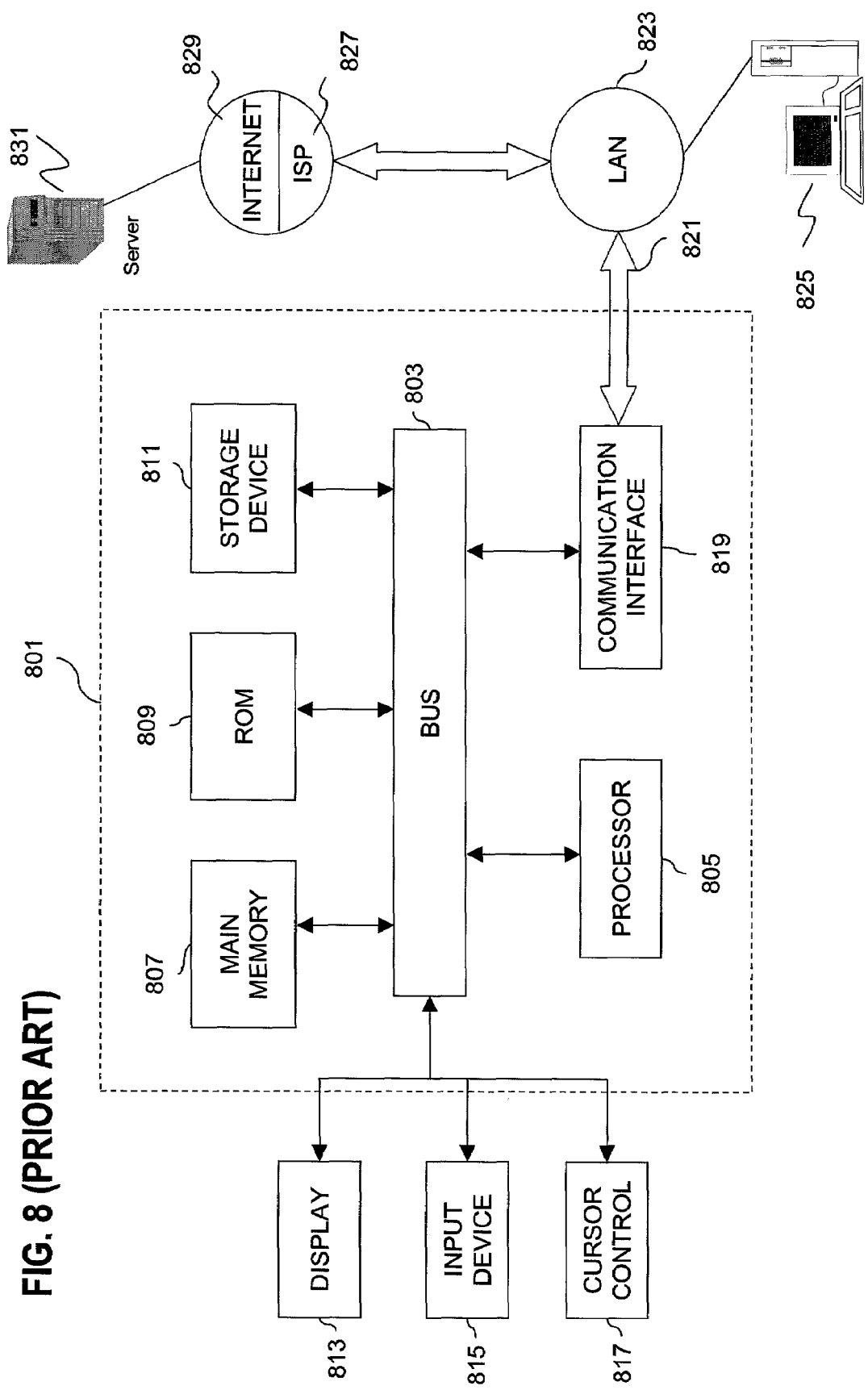
FIG. 8 is a block diagram of a computer system on which embodiments of the group controller of FIG. 2A, FIG. 2B, FIG. 2C may be implemented.
Figure 9:
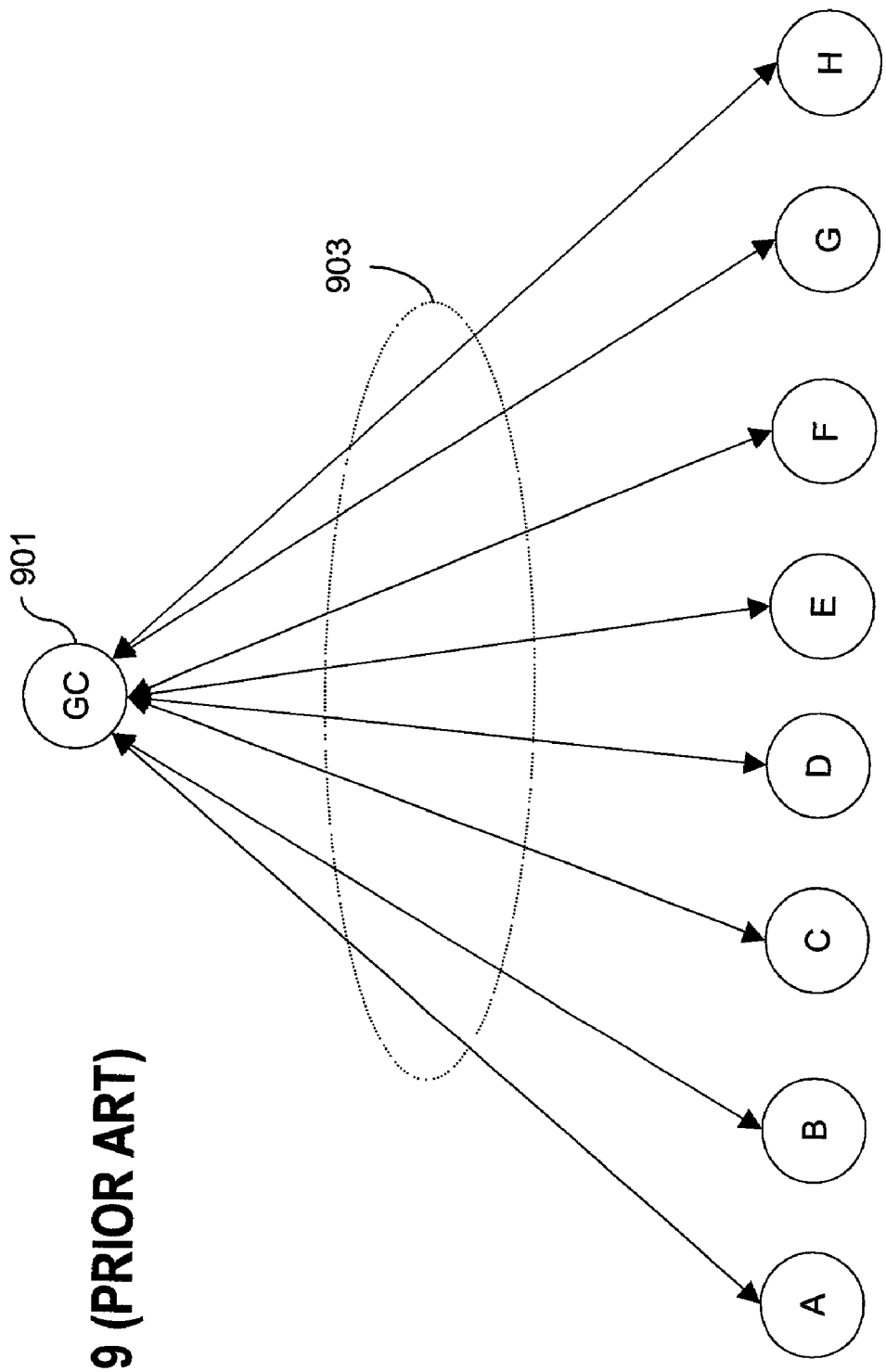
FIG. 9 is a diagram of a conventional secure communication system using a single centralized group controller.

FIG. 8 illustrates a computer system 801 upon which an embodiment may be implemented. Such a computer system 801 may be configured as a user node or server node to provide the various security and directory services as earlier discussed. Computer system 801 includes a bus 803 or other communication mechanism for communicating information, and a processor 805 coupled with bus 803 for processing the information. Computer system 801 also includes a main memory 807, such as a random access memory (RAM) or other dynamic storage device, coupled to bus 803 for storing information and instructions to be executed by processor 805. In addition, main memory 807 may be used for storing temporary variables or other intermediate information during execution of instructions to be executed by processor 805. Notably, the values associated with tracking the number of times a node engages in multicast group formation may be stored in main memory 807. Computer system 801 further includes a read only memory (ROM) 809 or other static storage device coupled to bus 803 for storing static information and instructions for processor 805. A storage device 811, such as a magnetic disk or optical disk, is provided and coupled to bus 803 for storing information and instructions. With respect to the system of FIGS. 2A-2C, information on the binary tree structure can be stored in device 811 for manipulation by processor 805.

Computer system 801 may be coupled via bus 803 to a display 813, such as a cathode ray tube (CRT), for displaying information to a computer user. An input device 815, including alphanumeric and other keys, is coupled to bus 803 for communicating information and command selections to processor 805. Another type of user input device is cursor control 817, such as a mouse, a trackball, or cursor direction keys for communicating direction information and command selections to processor 805 and for controlling cursor movement on display 813.

Embodiments are related to the use of computer system 801 to implement a public key exchange encryption approach for securely exchanging data between participants. According to one embodiment, the public key exchange encryption approach is provided by computer system 801 in response to processor 805 executing one or more sequences of one or more instructions contained in main memory 807. Such instructions may be read into main memory 807 from another computer-readable medium, such as storage device 811. Execution of the sequences of instructions contained in main memory 807 causes processor 805 to perform the process steps described herein. One or more processors in a multiprocessing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 805 for execution. Such a medium may take many forms, including but not limited to, non-volatile media, volatile media, and transmission media. Non-volatile media includes, for example, optical or magnetic disks, such as storage device 811. Volatile media includes dynamic memory, such as main memory 807. Transmission media includes coaxial cables, copper wire and fiber optics, including the wires that comprise bus 803. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 805 for execution. For example, the instructions may initially be carried on a magnetic disk of a remote computer. The remote computer can load the instructions relating to computation of the shared secret key into its dynamic memory and send the instructions over a telephone line using a modem. A modem local to computer system 801 can receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes a communication interface 819 coupled to bus 803. Communication interface 819 provides a two-way data communication coupling to a network link 821 that is connected to a local network 823. For example, communication interface 819 may be a network interface card to attach to any packet switched LAN. As another example, communication interface 819 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 819 sends and receives electrical, electromagnetic or optical signals that carry digital data streams representing various types of information.

Network link 821 typically provides data communication through one or more networks to other data devices. For example, network link 821 may provide a connection through local network 823 to a host computer 825 or to data equipment operated by an Internet Service Provider (ISP) 827. ISP 827 in turn provides data communication services through the Internet 829. Local network 823 and Internet 829 both use electrical, electromagnetic or optical signals that carry digital data streams. The signals through the various networks and the signals on network link 821 and through communication interface 819, which carry the digital data to and from computer system 801, are exemplary forms of carrier waves transporting the information.

Computer system 801 can send messages and receive data, including program code, through the network(s), network link 821 and communication interface 819. In the Internet example, a server 831 might transmit a requested code for an application program through Internet 829, ISP 827, local network 823 and communication interface 819. One such downloaded application provides a public key exchange encryption approach for securely exchanging data between participants as described herein.

The received code may be executed by processor 805 as it is received, and/or stored in storage device 811, or other non-volatile storage for later execution. In this manner, computer system 801 may obtain application code in the form of a carrier wave.

The techniques described herein provide several advantages over prior public key exchange encryption approaches for securely exchanging data among multiple participants using directory replication. By utilizing private keys that can serve as unique IDs, the keys can be stored efficiently. Further, the distributed group controllers exhibit improved system throughput and scalability.

As described in more detail herein, each DSA has a DRP component that can replicate objects and attributes for Security Principal Ids, Group Session Keys and Private Keys, Multicast Group Multicast Address, Topic Names, Event Types and Channels. They build a point to point secured channel using KDC or CA. Then using replicated keys and security principal Ids the system can create a secured channel of MKDC, MSAs, and GCs.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of establishing a secure communication session among a plurality of member nodes that participate in a multicast group across a wide area network, comprising the steps of:
   receiving information defining a plurality of multicast proxy service nodes, wherein:
      the plurality of multicast service nodes are distributed across the wide area network;
      the plurality of multicast service nodes control when any of the plurality of member nodes join or leave the multicast group; and
      the plurality of multicast proxy service nodes are logically represented by a first binary tree, wherein:
         each node of the first binary tree is associated with a domain of a plurality of domains of a directory service that is distributed across the wide area network; and
         each node of the first binary tree is associated with one or more multicast proxy service nodes of the plurality of multicast proxy service nodes;
   creating and storing a second binary tree that represents the plurality of member nodes, wherein:
      each of the member nodes of the plurality of member nodes is represented by a leaf node of the second binary tree;
      the second binary tree is stored in a particular domain of the plurality of domains of the directory service that is distributed across the wide area network;
      a root node of the second binary tree represents one or more of the multicast proxy service nodes of the plurality of multicast proxy service nodes; and
      each of the member nodes of the plurality of member nodes is capable of establishing multicast communication and serving as a key distribution center;
   creating and storing a group session key associated with the multicast group and a private key associated with each member node of the multicast group using secure key exchange;
   when an additional member node joins the multicast group, determining a new group session key by replicating a branch of the second binary tree.

2. A method as recited in claim 1, wherein each of the member nodes is associated with at least one of the multicast proxy service nodes, wherein each of the multicast proxy service nodes acts as one of a plurality of group controllers, further comprising the steps of:
   joining an additional group controller to the plurality of group controllers, wherein each group controller of the plurality of group controllers is a replica of another group controller of the plurality of group controllers;
   establishing, by one of the group controllers, a secure communication channel between one of the group controllers and another of the group controllers using a key exchange protocol;
   receiving a request to add or delete a specified member node of the multicast group from a load balancer that is coupled to the plurality of group controllers;
   creating and storing the new group session key for each member node in each branch of the second binary tree that is affected by adding or deleting the specified member node from the multicast group;
   distributing the new group session key from one of the group controllers to the member nodes that are affected by adding or deleting the specified member node.

3. A method as recited in claim 2, wherein distributing the new group session key further comprises the steps of:
   determining that the specified member node is leaving the multicast group;
   determining which of the intermediate nodes of the second binary tree are affected by the specified member node that is leaving;
   updating only keys associated with the intermediate nodes that are affected by the specified member node that is leaving; and
   sending the new group session key to the leaf nodes of the second binary tree that correspond to the member nodes that are affected by deleting the specified member node.

4. A method as recited in claim 2, wherein distributing the new group session key further comprises the steps of:
   receiving a request message from the specified member node to join the multicast group;
   determining which of the intermediate nodes of the second binary tree are affected by the specified member node that is joining the multicast group;
   updating only keys associated with the intermediate nodes that are affected by the specified member node that is joining;
   generating a private key for the specified member node that is joining; and sending a message comprising the new group session key, the private key, and the updated keys of intermediate nodes that are affected to the member node that is joining.

5. A method as recited in claim 1, wherein determining the new group session key further comprises the step of computing a group shared secret key at a first member node of the plurality of member nodes for use in a public key process and using less than n*(n−1) messages, where "n" is a number of member nodes in the multicast group, by the steps of:
   generating an intermediate shared secret key by issuing communications to a second member node of the plurality of member nodes;
   sending a first private value associated with the first member node to the second member node;
   receiving from the second member node a second private value associated with the second member node using the intermediate shared secret key;
   generating and communicating a collective public key that is based upon the first private value and the second private value to a third member node of the plurality of member nodes;
   receiving an individual public key from the third member node; and
   computing and storing the group shared secret key based upon the individual public key.

6. A method as recited in claim 5, wherein the step of communicating the collective public key further comprises the step of determining whether the first member node or the second member node transfers the collective public key based upon an order of entry of the first and second member nodes into the multicast group.

7. A method as recited in claim 5, wherein computing and storing the group shared secret key further comprises the steps of computing and storing a group shared secret key value "k" at the first member node according to the relation:

$$k=C^{ab} \bmod(q) = p^{abc} \bmod(q);$$

wherein:
   C, a, b, c, q, and p are values stored in a memory,
   C is the individual public key,
   a is the first private value of the first member node,
   b is the second private value of the second member node,
   c is a third private value of the third member node,
   p is a base value, and
   q is a prime number value.

8. A method as recited in claim 1, wherein determining the new group session key further comprises the step of computing a group shared secret key, each of the member nodes of the plurality of member nodes having a private key associated therewith, by the steps of:
   communicating a first public key of a first member node of the plurality of member nodes to a second member node of the plurality of member nodes;
   creating and storing an initial shared secret key for the first member node and the second member node based on a first private key and a second public key that is received from the second member node;
   creating and storing information at the first member node that associates the first member node with a first entity by generating a collective public key that is shared by the first member node and the second member node, wherein the collective public key is based on the first private key and a second private key that is derived by the first member node from the second public key;
   receiving a third public key from a third member node of the plurality of member nodes that seeks to join the first entity;
   creating and storing a final shared secret key based on the collective public key and a third public key;
   joining the first member node to a second entity that includes the first entity and the third member node and that uses secure communication with messages that are encrypted using the final shared secret key.

9. A method as recited in claim 8, further comprising the steps of creating and storing a subsequent shared secret key for use by the first entity and the third member node to enable the third member node to independently compute the group shared secret key, wherein creating and storing the subsequent shared secret key further comprises the steps of creating and storing a subsequent shared secret key value, k, according to the relation:

$$k=p^{(a^*x)(b^*y)(c^*z)} \bmod(q)$$

where:
   p=a random number,
   q=a prime number,
   a=the first private key,
   b=the second private key,
   c=a third private key of the third member node,
   x=a number of times the first member node has participated in entity formation,
   y=a number of times the second member node has participated in entity formation, and
   z=a number of times the third member node has participated in entity formation.

10. A method as recited in claim 8, wherein creating and storing the initial shared secret key for the first member node and second member node further comprises the steps of creating and storing an initial shared public key value "AB" according to the relation:

$$AB=k_{ab}{}^{ab} \bmod(q) = p^{(ab)(ab)} \bmod(q)$$

wherein:
   k=the initial shared secret key,
   a=the first private key,
   b=the second private key,
   p is a base value, and
   q is a randomly generated prime number.

11. A method as recited in claim 1, further comprising the steps of:
   authenticating a first multicast proxy service node with a subset of the multicast proxy service nodes of the plurality of multicast proxy service nodes that are affected by an addition of the first multicast proxy service node to the multicast group, based on key information stored in a directory;
   wherein authenticating the first multicast proxy service node based on key information stored in the directory includes authenticating the first multicast proxy service node based on the directory that comprises a directory system agent (DSA) for communicating with one or more of the multicast proxy service nodes and a replication service agent (RSA) for replicating attribute information of one or more multicast proxy service nodes, wherein the attribute information comprises the group session key and the private keys of the one or more multicast proxy service nodes;
   receiving a plurality of private keys from the subset of multicast proxy service nodes;
   generating a new private key for the first multicast proxy service node;

communicating the plurality of private keys and the new private key to the first multicast proxy service node;

communicating a message to the subset of multicast proxy service nodes that causes the subset of multicast proxy service nodes to update their private keys;

distributing the new group session key to all multicast proxy service nodes of the plurality of multicast proxy service nodes by the steps of:

creating and storing the new group session key using a particular multicast proxy service node of a particular domain of the plurality of domains of the directory service, wherein the particular domain is associated with the directory;

replicating the directory; and obtaining the new group session key from a local multicast proxy service node that is a replica of the first multicast proxy service node.

12. A method as recited in claim 11, further comprising the step of selectively updating the group session key and the private keys, wherein the step of selectively updating further comprises the steps of:

detecting whether a member node of the plurality of member nodes that is associated with one of the leaf nodes is leaving the multicast group;

determining one or more tree nodes along a tree path in the second binary tree that corresponds to the leaving leaf node, wherein the one or more tree nodes are affected in response to the detecting step;

updating the private keys of the one or more tree nodes;

one of the affected intermediate nodes that is a parent node of the leaving leaf node generating the new group session key and selectively sending the new group session key to all ancestral nodes along the tree path;

modifying the key information based upon the updated private keys and the new group session key; and generating instructions that distribute the modified key information using directory replication.

13. A method as recited in claim 11, further comprising the step of selectively updating the group session key and the private keys, wherein the step of selectively updating further comprises the steps of:

receiving a request message from a new member node to join the multicast group;

determining one or more tree nodes along a tree path in the second binary tree that corresponds to a new leaf node in the second binary tree for the new member node, wherein the one or more nodes are affected in response to the receiving step;

updating the private keys of the one or more tree nodes;

one of the affected intermediate nodes that is a parent node of the new leaf node requesting permission from a root node of the second binary tree to generate the new session key and generating the new group session key and a private key of the new leaf node;

modifying the key information based upon the updated private keys, the new group session key, and the private key of the new leaf node; and generating instructions that distribute the modified key information using directory replication.

14. A method as recited in claim 1, further comprising the steps of:

storing the group session key associated with the multicast group in a directory of the directory service;

authenticating a first multicast proxy service node with a subset of multicast proxy service nodes of the plurality of multicast proxy service nodes that are affected by an addition of the first multicast proxy service node to the multicast group, based on the group session key stored in the directory;

receiving a plurality of private keys from the subset of multicast proxy service nodes;

receiving the new group session key for the multicast group, for use after addition of the first multicast proxy service node, from a directory system agent (DSA) of a local multicast proxy service node that has received the new group session key through periodic replication of the directory by a replication service agent (RSA) of the local multicast proxy service node, wherein the RSA is signaled to carry out replication by storing an updated group session key in a local node of the directory;

communicating the new group session key to the first multicast proxy service node;

communicating a message to the subset of multicast proxy service nodes that causes the subset of multicast proxy service nodes to update their private keys.

15. A method as recited in claim 14, further comprising the steps of:

distributing the group session key to all member nodes of the plurality of member nodes by creating and storing the group session key using a particular multicast proxy service node of the plurality of multicast proxy service nodes, wherein the particular multicast proxy service node is associated with a particular domain of the plurality of domains, and wherein the particular domain is associated with the directory;

replicating the directory; and obtaining the group session key from a local multicast proxy service node that is a replica of the particular multicast proxy service node.

16. A method as recited in claim 14, further comprising the steps of:

associating a plurality of intermediate nodes of the second binary tree with a plurality of multicast service agents;

establishing a secure back channel group among the plurality of multicast service agents;

updating the group session key to all the multicast service agents in the plurality of multicast service agents by securely communicating the group session key using a secure back channel that is associated with the secure back channel group;

at each intermediate node of the plurality of intermediate nodes, updating the group session key of only those leaf nodes that are child nodes of said each intermediate node.

17. A method as recited in claim 14, further comprising the steps of:

receiving a request for the group session key from a publisher node that is located in a different domain of the plurality of domains from the particular domain in which is stored the second binary tree;

determining an identifier of the publisher node using a first directory service agent that is associated with a particular multicast proxy service node of the plurality of multicast proxy service nodes, wherein the particular multicast proxy service node is in the particular domain;

establishing a secure communication channel among the particular multicast proxy service node and a directory service agent that is associated with a different multicast proxy service node of the plurality of multicast proxy service nodes, wherein the different multicast proxy service node is in the different domain.

18. A method as recited in claim 1, further comprising the step of managing removal of a first member node from the multicast group, wherein managing removal of the first member node further comprises the steps of:

creating and storing the group session key associated with the multicast group and a private key associated with each member node of the plurality of member nodes in a directory;

receiving information indicating that the first member node is leaving the multicast group;

updating all affected keys of a subset of member nodes of the plurality of member nodes in a branch of the second binary tree that contains the first member node that is leaving;

receiving the new group session key for the multicast group, for use after removal of the first member node, and a new private key for a parent node of the first member node, from a local multicast proxy service node of the plurality of multicast proxy service nodes;

communicating a message to the subset of member nodes that causes the subset of member nodes to update their private keys.

19. A method as recited in claim 18, further comprising the steps of:

associating a plurality of intermediate nodes of the second binary tree with a plurality of multicast service agents;

establishing a secure back channel group among the plurality of multicast service agents;

updating the group session key to all the multicast service agents in the plurality of multicast service agents by securely communicating the group session key using a secure back channel that is associated with the secure back channel group;

at each intermediate node of the plurality of intermediate nodes, updating the group session key of only those leaf nodes that are child nodes of said each intermediate node.

20. A method as recited in claim 18, further comprising the steps of:

receiving a request for the group session key from a publisher node that is located in a different domain of the plurality of domains from the particular domain in which is stored the second binary tree;

determining an identifier of the publisher node using a first directory service agent that is associated with a particular multicast proxy service node of the plurality of multicast proxy service nodes, wherein the particular multicast proxy service node is in the particular domain;

establishing a secure communication channel among the particular multicast proxy service node and a directory service agent that is associated with a different multicast proxy service node of the plurality of multicast proxy service nodes, wherein the different multicast proxy service node is in the different domain.

21. A method as recited in claim 18, further comprising the steps of:

distributing the group session key to all member nodes of the plurality of member nodes by creating and storing the group session key using a particular multicast proxy service node of the plurality of multicast proxy service nodes, wherein the particular multicast proxy service node is associated with a particular domain of the plurality of domains, and wherein the particular domain is associated with the directory;

replicating the directory; and obtaining the group session key from a local multicast proxy service node that is a replica of the particular multicast proxy service node.

22. A computer-readable medium carrying one or more sequences of instructions for establishing a secure communication session among a plurality of member nodes that participate in a multicast group across a wide area network, wherein execution of the one or more sequences of instructions by one or more processors causes the one or more processors to perform the steps of:

receiving information defining a plurality of multicast proxy service nodes, wherein:
the plurality of multicast service nodes are distributed across the wide area network;
the plurality of multicast service nodes control when any of the plurality of member nodes join or leave the multicast group; and
the plurality of multicast proxy service nodes are logically represented by a first binary tree, wherein:
each node of the first binary tree is associated with a domain of a plurality of domains of a directory service that is distributed across the wide area network; and
each node of the first binary tree is associated with one or more multicast proxy service nodes of the plurality of multicast proxy service nodes;

creating and storing a second binary tree that represents the plurality of member nodes, wherein:
each of the member nodes of the plurality of member nodes is represented by a leaf node of the second binary tree;
the second binary tree is stored in a particular domain of the plurality of domains of the directory service that is distributed across the wide area network;
a root node of the second binary tree represents one or more of the multicast proxy service nodes of the plurality of multicast proxy service nodes; and
each of the member nodes of the plurality of member nodes is capable of establishing multicast communication and serving as a key distribution center;

creating and storing a group session key associated with the multicast group and a private key associated with each member node of the multicast group using secure key exchange;

when an additional member node joins the multicast group, determining a new group session key by replicating a branch of the second binary tree.

23. An apparatus for establishing a secure communication session among a plurality of member nodes that participate in a multicast group across a wide area network, the apparatus comprising:

means for receiving information defining a plurality of multicast proxy service nodes that are distributed across the wide area network and that are operable to control when any of the plurality of member nodes join or leave the multicast group;

means for creating and storing a first binary tree that represents the plurality of multicast proxy service nodes, wherein:
each node of the first binary tree is associated with a domain of a plurality of domains of a directory service that is distributed across the wide area network; and
each node of the first binary tree is associated with one or more multicast proxy service nodes of the plurality of multicast proxy service nodes;

means for creating and storing, in a particular domain of the plurality of domains of the directory service that is distributed across the wide area network, a second binary tree that represents the plurality of member nodes, wherein:

each of the member nodes of the plurality of member nodes is represented by a leaf node of the secondary binary tree;

a root node of the second binary tree represents one or more of the multicast proxy service nodes of the plurality of multicast proxy service nodes; and each of the member nodes of the plurality of member nodes is operable to establish multicast communication and to serve as a key distribution center;

means for creating and storing a group session key associated with the multicast group and a private key associated with each member node of the multicast group using secure key exchange;

means for determining a new group session key by replicating a branch of the second binary tree when an additional member node joins the multicast group.

24. An apparatus as recited in claim 23, wherein each of the member nodes is associated with at least one of the multicast proxy service nodes, wherein each of the multicast proxy service nodes acts as one of a plurality of group controllers, and the apparatus further comprises:

means for joining an additional group controller to the plurality of group controllers, wherein each group controller of the plurality of group controllers is a replica of another group controller of the plurality of group controllers;

means for establishing, by one of the group controllers, a secure communication channel between one of the group controllers and another of the group controllers using a key exchange protocol;

means for receiving a request to add or delete a specified member node of the multicast group from a load balancer that is coupled to the plurality of group controllers;

means for creating and storing the new group session key for each member node in each branch of the second binary tree that is affected by adding or deleting the specified member node from the multicast group;

means for distributing the new group session key from one of the group controllers to the member nodes that are affected by adding or deleting the specified member node.

25. An apparatus as recited in claim 24, wherein the means for distributing the new group session key further comprises:

means for determining that the specified member node is leaving the multicast group;

means for determining which of the intermediate nodes of the second binary tree are affected by the specified member node that is leaving;

means for updating only keys associated with the intermediate nodes that are affected by the specified member node that is leaving; and means for sending the new group session key to the leaf nodes of the second binary tree that correspond to the member nodes that are affected by deleting the specified member node.

26. An apparatus as recited in claim 24, wherein the means for distributing the new group session key further comprises:

means for receiving a request message from the specified member node to join the multicast group;

means for determining which of the intermediate nodes of the second binary tree are affected by the specified member node that is joining the multicast group;

means for updating only keys associated with the intermediate nodes that are affected by the specified member node that is joining;

means for generating a private key for the specified member node that is joining; and means for sending a message comprising the new group session key, the private key, and the updated keys of intermediate nodes that are affected to the member node that is joining.

27. An apparatus as recited in claim 23, wherein the means for determining the new group session key further comprises means for computing a group shared secret key at a first member node of the plurality of member nodes for use in a public key process and using less than n*(n−1) messages, wherein "n" is a number of member nodes in the multicast group, wherein the means for computing the group shared secret key further comprises:

means for generating an intermediate shared secret key by issuing communications to a second member node of the plurality of member nodes;

means for sending a first private value associated with the first member node to the second member node;

means for receiving from the second member node a second private value associated with the second member node using the intermediate shared secret key;

means for generating and communicating a collective public key that is based upon the first private value and the second private value to a third member node of the plurality of member nodes;

means for receiving an individual public key from the third member node; and means for computing and storing the group shared secret key based upon the individual public key.

28. An apparatus as recited in claim 27, wherein the means for communicating the collective public key further comprises means for determining whether the first member node or the second member node transfers the collective public key based upon an order of entry of the first and second member nodes into the multicast group.

29. An apparatus as recited in claim 27, wherein the means for computing and storing the group shared secret key further comprises means for computing and storing a group shared secret key value "k" at the first member node according to the relation:

$$k = C^{ab} \bmod(q) = p^{abc} \bmod(q);$$

wherein:

C, a, b, c, q, and p are values stored in a memory,

C is the individual public key, a is the first private value of the first member node, b is the second private value of the second member node, c is a third private value of the third member node, p is a base value, and q is a prime number value.

30. An apparatus as recited in claim 23, wherein the means for determining the new group session key further comprises means for computing a group shared secret key, each of the member nodes of the plurality of member nodes having a private key associated therewith, wherein the means for computing the group shared secret key further comprises:

means for communicating a first public key of a first member node of the plurality of member nodes to a second member node of the plurality of member nodes;

means for creating and storing an initial shared secret key for the first member node and the second member node based on a first private key and a second public key that is received from the second member node;

means for creating and storing information at the first member node that associates the first member node with a first entity by generating a collective public key that is shared by the first member node and the second member node, wherein the collective public key is based on the first private key and a second private key that is derived by the first member node from the second public key;

means for receiving a third public key from a third member node of the plurality of member nodes that seeks to join the first entity;

means for creating and storing a final shared secret key based on the collective public key and a third public key;

means for joining the first member node to a second entity that includes the first entity and the third member node and that uses secure communication with messages that are encrypted using the final shared secret key.

31. An apparatus as recited in claim 30, further comprising means for creating and storing a subsequent shared secret key for use by the first entity and the third member node to enable the third member node to independently compute the group shared secret key, wherein the means for creating and storing the subsequent shared secret key further comprises means for creating and storing a subsequent shared secret key value, k, according to the relation:

$$k=p^{(a*x)(b*y)(c*z)}\mod(q)$$

where:
p=a random number,
q=a prime number,
a=the first private key,
b=the second private key,
c=a third private key of the third member node,
x=a number of times the first member node has participated in entity formation,
y=a number of times the second member node has participated in entity formation, and
z=a number of times the third member node has participated in entity formation.

32. An apparatus as recited in claim 30, wherein the means for creating and storing the initial shared secret key for the first member node and second member node further comprises means for creating and storing an initial shared public key value "AB" according to the relation:

$$AB=k_{ab}{}^{ab}\mod(q)=p^{(ab)(ab)}\mod(q)$$

wherein:
k=the initial shared secret key,
a=the first private key,
b=the second private key,
p is a base value, and
q is a randomly generated prime number.

33. An apparatus as recited in claim 23, further comprising:

means for authenticating a first multicast proxy service node with a subset of the multicast proxy service nodes of the plurality of multicast proxy service nodes that are affected by an addition of the first multicast proxy service node to the multicast group, based on key information stored in a directory;

wherein the means for authenticating the first multicast proxy service node based on key information stored in the directory includes means for authenticating the first multicast proxy service node based on the directory that comprises a directory system agent (DSA) for communicating with one or more of the multicast proxy service nodes and a replication service agent (RSA) for replicating attribute information of one or more multicast proxy service nodes, wherein the attribute information comprises the group session key and the private keys of the one or more multicast proxy service nodes;

means for receiving a plurality of private keys from the subset of multicast proxy service nodes;

means for generating a new private key for the first multicast proxy service node;

means for communicating the plurality of private keys and the new private key to the first multicast proxy service node;

means for communicating a message to the subset of multicast proxy service nodes that causes the subset of multicast proxy service nodes to update their private keys;

means for distributing the new group session key to all multicast proxy service nodes of the plurality of multicast proxy service nodes by:

creating and storing the new group session key using a particular multicast proxy service node of a particular domain of the plurality of domains of the directory service, wherein the particular domain is associated with the directory;

replicating the directory; and obtaining the new group session key from a local multicast proxy service node that is a replica of the first multicast proxy service node.

34. An apparatus as recited in claim 33, further comprising means for selectively updating the group session key and the private keys, wherein the means for selectively updating further comprises:

means for detecting whether a member node of the plurality of member nodes that is associated with one of the leaf nodes is leaving the multicast group;

means for determining one or more tree nodes along a tree path in the second binary tree that corresponds to the leaving leaf node, wherein the one or more tree nodes are affected in response to detecting whether the member node is leaving;

means for updating the private keys of the one or more tree nodes;

means for one of the affected intermediate nodes that is a parent node of the leaving leaf node generating the new group session key and selectively sending the new group session key to all ancestral nodes along the tree path;

means for modifying the key information based upon the updated private keys and the new group session key; and means for generating instructions that distribute the modified key information using directory replication.

35. An apparatus as recited in claim 33, further comprising means for selectively updating the group session key and the private keys, wherein the means for selectively updating comprises:

means for receiving a request message from a new member node to join the multicast group;

means for determining one or more tree nodes along a tree path in the second binary tree that corresponds to a new leaf node in the second binary tree for the new member node, wherein the one or more nodes are affected in response to receiving the request message;

means for updating the private keys of the one or more tree nodes;

means for one of the affected intermediate nodes that is a parent node of the new leaf node requesting permission from a root node of the second binary tree to generate the new session key and generating the new group session key and a private key of the new leaf node;

means for modifying the key information based upon the updated private keys, the new group session key, and the private key of the new leaf node; and means for generating instructions that distribute the modified key information using directory replication.

36. An apparatus as recited in claim 23, further comprising:

means for storing the group session key associated with the multicast group in a directory of the directory service;

means for authenticating a first multicast proxy service node with a subset of multicast proxy service nodes of the plurality of multicast proxy service nodes that are affected by an addition of the first multicast proxy service node to the multicast group, based on the group session key stored in the directory;

means for receiving a plurality of private keys from the subset of multicast proxy service nodes;

means for receiving the new group session key for the multicast group, for use after addition of the first multicast proxy service node, from a directory system agent (DSA) of a local multicast proxy service node that has received the new group session key through periodic replication of the directory by a replication service agent (RSA) of the local multicast proxy service node, wherein the RSA is signaled to carry out replication by storing an updated group session key in a local node of the directory;

means for communicating the new group session key to the first multicast proxy service node;

means for communicating a message to the subset of multicast proxy service nodes that causes the subset of multicast proxy service nodes to update their private keys.

37. An apparatus as recited in claim 36, further comprising:
means for distributing the group session key to all member nodes of the plurality of member nodes by creating and storing the group session key using a particular multicast proxy service node of the plurality of multicast proxy service nodes, wherein the particular multicast proxy service node is associated with a particular domain of the plurality of domains, and wherein the particular domain is associated with the directory;
means for replicating the directory; and
means for obtaining the group session key from a local multicast proxy service node that is a replica of the particular multicast proxy service node.

38. An apparatus as recited in claim 36, further comprising:
means for associating a plurality of intermediate nodes of the second binary tree with a plurality of multicast service agents;
means for establishing a secure back channel group among the plurality of multicast service agents;
means for updating the group session key to all the multicast service agents in the plurality of multicast service agents by securely communicating the group session key using a secure back channel that is associated with the secure back channel group;
means for updating, at each intermediate node of the plurality of intermediate nodes, the group session key of only those leaf nodes that are child nodes of said each intermediate node.

39. An apparatus as recited in claim 36, further comprising:
means for receiving a request for the group session key from a publisher node that is located in a different domain of the plurality of domains from the particular domain in which is stored the second binary tree;
means for determining an identifier of the publisher node using a first directory service agent that is associated with a particular multicast proxy service node of the plurality of multicast proxy service nodes, wherein the particular multicast proxy service node is in the particular domain;
means for establishing a secure communication channel among the particular multicast proxy service node and a directory service agent that is associated with a different multicast proxy service node of the plurality of multicast proxy service nodes, wherein the different multicast proxy service node is in the different domain.

40. An apparatus as recited in claim 23, further comprising means for managing removal of a first member node from the multicast group, wherein the means for managing further comprise:
means for creating and storing the group session key associated with the multicast group and a private key associated with each member node of the plurality of member nodes in a directory;
means for receiving information indicating that the first member node is leaving the multicast group;
means for updating all affected keys of a subset of member nodes of the plurality of member nodes in a branch of the second binary tree that contains the first member node that is leaving;
means for receiving the new group session key for the multicast group, for use after removal of the first member node, and a new private key for a parent node of the first member node, from a local multicast proxy service node of the plurality of multicast proxy service nodes;
means for communicating a message to the subset of member nodes that causes the subset of member nodes to update their private keys.

41. An apparatus as recited in claim 40, further comprising:
means for associating a plurality of intermediate nodes of the second binary tree with a plurality of multicast service agents;
means for establishing a secure back channel group among the plurality of multicast service agents;
means for updating the group session key to all the multicast service agents in the plurality of multicast service agents by securely communicating the group session key using a secure back channel that is associated with the secure back channel group;
means for updating, at each intermediate node of the plurality of intermediate nodes, the group session key of only those leaf nodes that are child nodes of said each intermediate node.

42. An apparatus as recited in claim 40, further comprising:
means for receiving a request for the group session key from a publisher node that is located in a different domain of the plurality of domains from the particular domain in which is stored the second binary tree;
means for determining an identifier of the publisher node using a first directory service agent that is associated with a particular multicast proxy service node of the plurality of multicast proxy service nodes, wherein the particular multicast proxy service node is in the particular domain;
means for establishing a secure communication channel among the particular multicast proxy service node and a directory service agent that is associated with a different multicast proxy service node of the plurality of multicast proxy service nodes, wherein the different multicast proxy service node is in the different domain.

43. An apparatus as recited in claim 40, further comprising:
means for distributing the group session key to all member nodes of the plurality of member nodes by creating and storing the group session key using a particular multicast proxy service node of the plurality of multicast proxy service nodes, wherein the particular multicast proxy service node is associated with a particular domain of the plurality of domains, and wherein the particular domain is associated with the directory;
means for replicating the directory; and means for obtaining the group session key from a local multicast proxy service node that is a replica of the particular multicast proxy service node.

44. A communication system for establishing a secure communication session among a plurality of member nodes that participate in a multicast group across a wide area network, the communication system comprising:
   a plurality of multicast proxy service nodes that are distributed across the wide area network and that are operable to control when any of the plurality of member nodes join or leave the multicast group;
   wherein each of the member nodes of the plurality of member nodes is operable to establish multicast communication and to serve as a key distribution center;
   first logic encoded in one or more tangible media for execution and when executed operable to create and store a first binary tree that represents the plurality of multicast proxy service nodes, wherein:
      each node of the first binary tree is associated with a domain of a plurality of domains of a directory service that is distributed across the wide area network; and
      each node of the first binary tree is associated with one or more multicast proxy service nodes of the plurality of multicast proxy service nodes;
   second logic encoded in one or more tangible media for execution and when executed operable to:
      create and store, in a particular domain of the plurality of domains of the directory service that is distributed across the wide area network, a second binary tree that represents the plurality of member nodes, wherein:
         each of the member nodes of the plurality of member nodes is represented by a leaf node of the second binary tree; and
         a root node of the second binary tree represents one or more of the multicast proxy service nodes of the plurality of multicast proxy service nodes;
      create and store a group session key associated with the multicast group and a private key associated with each member node of the multicast group using secure key exchange; and
      determine a new group session key by replicating a branch of the second binary tree when an additional member node joins the multicast group.

45. A communication system as recited in claim 44, wherein each of the member nodes is associated with at least one of the multicast proxy service nodes, wherein each of the multicast proxy service nodes acts as one of a plurality of group controllers, and wherein the second logic comprises logic which when executed is operable to:
   join an additional group controller to the plurality of group controllers, wherein each group controller of the plurality of group controllers is a replica of another group controller of the plurality of group controllers;
   establish, by one of the group controllers, a secure communication channel between one of the group controllers and another of the group controllers using a key exchange protocol;
   receive a request to add or delete a specified member node of the multicast group from a load balancer that is coupled to the plurality of group controllers;
   create and store the new group session key for each member node in each branch of the second binary tree that is affected by adding or deleting the specified member node from the multicast group;
   distribute the new group session key from one of the group controllers to the member nodes that are affected by adding or deleting the specified member node.

46. A communication system as recited in claim 45, wherein the logic operable to distribute the new group session key further comprises logic which when executed is operable to:
   determine that the specified member node is leaving the multicast group;
   determine which of the intermediate nodes of the second binary tree are affected by the specified member node that is leaving;
   update only keys associated with the intermediate nodes that are affected by the specified member node that is leaving; and
   send the new group session key to the leaf nodes of the second binary tree that correspond to the member nodes that are affected by deleting the specified member node.

47. A communication system as recited in claim 45, wherein the logic operable to distribute the new group session key further comprises logic which when executed is operable to:
   receive a request message from the specified member node to join the multicast group;
   determine which of the intermediate nodes of the second binary tree are affected by the specified member node that is joining the multicast group;
   update only keys associated with the intermediate nodes that are affected by the specified member node that is joining;
   generate a private key for the specified member node that is joining; and
   send a message comprising the new group session key, the private key, and the updated keys of intermediate nodes that are affected to the member node that is joining.

48. A communication system as recited in claim 44, wherein the logic operable to determine the new group session key further comprises logic which when executed is operable to compute a group shared secret key at a first member node of the plurality of member nodes for use in a public key process and to use less than $n*(n-1)$ messages, wherein "n" is a number of member nodes in the multicast group, wherein the logic operable to compute the group shared secret key comprises logic which when executed is operable to:
   generate an intermediate shared secret key by issuing communications to a second member node of the plurality of member nodes;
   send a first private value associated with the first member node to the second member node;
   receive from the second member node a second private value associated with the second member node using the intermediate shared secret key;
   generate and communicate a collective public key that is based upon the first private value and the second private value to a third member node of the plurality of member nodes;
   receive an individual public key from the third member node; and
   compute and store the group shared secret key based upon the individual public key.

49. A communication system as recited in claim 48, wherein the logic operable to communicate the collective public key further comprises logic which when executed is operable to determine whether the first member node or the second member node transfers the collective public key based upon an order of entry of the first and second member nodes into the multicast group.

50. A communication system as recited in claim 48, wherein the logic operable to compute and store the group shared secret key further comprises logic which when executed is operable to compute and store a group shared secret key value "k" at the first member node according to the relation:

$$k=C^{ab} \bmod(q)=p^{abc} \bmod(q);$$

wherein:
C, a, b, c, q, and p are values stored in a memory,
C is the individual public key,
a is the first private value of the first member node,
b is the second private value of the second member node,
c is a third private value of the third member node,
p is a base value, and
q is a prime number value.

51. A communication system as recited in claim 44, wherein the logic operable to determine the new group session key further comprises logic which when executed is operable to compute a group shared secret key, each of the member nodes of the plurality of member nodes having a private key associated therewith, wherein the logic operable to compute the group shared secret key comprises logic which when executed is operable to:
    communicate a first public key of a first member node of the plurality of member nodes to a second member node of the plurality of member nodes;
    create and store an initial shared secret key for the first member node and the second member node based on a first private key and a second public key that is received from the second member node;
    create and store information at the first member node that associates the first member node with a first entity by generating a collective public key that is shared by the first member node and the second member node, wherein the collective public key is based on the first private key and a second private key that is derived by the first member node from the second public key;
    receive a third public key from a third member node of the plurality of member nodes that seeks to join the first entity;
    create and store a final shared secret key based on the collective public key and a third public key;
    join the first member node to a second entity that includes the first entity and the third member node and that uses secure communication with messages that are encrypted using the final shared secret key.

52. A communication system as recited in claim 51, wherein the second logic comprises logic which when executed is operable to create and store a subsequent shared secret key for use by the first entity and the third member node to enable the third member node to independently compute the group shared secret key, wherein the logic operable to create and store the subsequent shared secret key comprises logic which when executed is operable to create and store a subsequent shared secret key value, k, according to the relation:

$$k=p^{(a*x)(b*y)(c*z)} \bmod(q)$$

wherein:
p=a random number,
q=a prime number,
a=the first private key,
b=the second private key,
c=a third private key of the third member node,
x=a number of times the first member node has participated in entity formation,
y=a number of times the second member node has participated in entity formation, and
z=a number of times the third member node has participated in entity formation.

53. A communication system as recited in claim 51, wherein the logic operable to create and store the initial shared secret key for the first member node and second member node further comprises logic which when executed is operable to create and store an initial shared public key value "AB" according to the relation:

$$AB=k_{ab}^{ab} \bmod(q)=p^{(ab)(ab)} \bmod(q)$$

wherein:
k=the initial shared secret key,
a=the first private key,
b=the second private key,
p is a base value, and
q is a randomly generated prime number.

54. A communication system as recited in claim 44, wherein the second logic comprises logic which when executed is operable to:
    authenticate a first multicast proxy service node with a subset of the multicast proxy service nodes of the plurality of multicast proxy service nodes that are affected by an addition of the first multicast proxy service node to the multicast group, based on key information stored in a directory;
    wherein authenticating the first multicast proxy service node based on key information stored in the directory includes authenticating the first multicast proxy service node based on the directory that comprises a directory system agent (DSA) for communicating with one or more of the multicast proxy service nodes and a replication service agent (RSA) for replicating attribute information of one or more multicast proxy service nodes, wherein the attribute information comprises the group session key and the private keys of the one or more multicast proxy service nodes;
    receive a plurality of private keys from the subset of multicast proxy service nodes;
    generate a new private key for the first multicast proxy service node;
    communicate the plurality of private keys and the new private key to the first multicast proxy service node;
    communicate a message to the subset of multicast proxy service nodes that causes the subset of multicast proxy service nodes to update their private keys;
    distribute the new group session key to all multicast proxy service nodes of the plurality of multicast proxy service nodes, wherein the logic operable to distribute the new group session key to all multicast proxy service nodes further comprises logic which when executed is operable to:
        create and store the new group session key using a particular multicast proxy service node of a particular domain of the plurality of domains of the directory service, wherein the particular domain is associated with the directory;
        replicate the directory; and
        obtain the new group session key from a local multicast proxy service node that is a replica of the first multicast proxy service node.

55. A communication system as recited in claim 54, wherein the second logic comprises logic which when executed is operable to selectively update the group session key and the private keys, wherein the logic operable to selectively update the group session key and the private keys further comprise logic which when executed is operable to:

detect whether a member node of the plurality of member nodes that is associated with one of the leaf nodes is leaving the multicast group;

determine one or more tree nodes along a tree path in the second binary tree that corresponds to the leaving leaf node;

update the private keys of the one or more tree nodes;

at one of the affected intermediate nodes that is a parent node of the leaving leaf node, generate the new group session key and selectively send the new group session key to all ancestral nodes along the tree path;

modify the key information based upon the updated private keys and the new group session key; and generate instructions that distribute the modified key information using directory replication.

56. A communication system as recited in claim 54, wherein the second logic comprises logic which when executed is operable to selectively update the group session key and the private keys, wherein the logic operable to selectively update the group session key and the private keys further comprises logic which when executed is operable to:

receive a request message from a new member node to join the multicast group;

determine one or more tree nodes along a tree path in the second binary tree that corresponds to a new leaf node in the second binary tree for the new member node;

update the private keys of the one or more tree nodes;

at one of the affected intermediate nodes that is a parent node of the new leaf node, request permission from a root node of the second binary tree to generate the new session key and to generate the new group session key and a private key of the new leaf node;

modify the key information based upon the updated private keys, the new group session key, and the private key of the new leaf node; and generate instructions that distribute the modified key information using directory replication.

57. A communication system as recited in claim 44, wherein the second logic comprises logic which when executed is operable to:

store the group session key associated with the multicast group in a directory of the directory service;

authenticate a first multicast proxy service node with a subset of multicast proxy service nodes of the plurality of multicast proxy service nodes that are affected by an addition of the first multicast proxy service node to the multicast group, based on the group session key stored in the directory;

receive a plurality of private keys from the subset of multicast proxy service nodes;

receive the new group session key for the multicast group, for use after addition of the first multicast proxy service node, from a directory system agent (DSA) of a local multicast proxy service node that has received the new group session key through periodic replication of the directory by a replication service agent (RSA) of the local multicast proxy service node, wherein the RSA is signaled to carry out replication by storing an updated group session key in a local node of the directory;

communicate the new group session key to the first multicast proxy service node;

communicate a message to the subset of multicast proxy service nodes that causes the subset of multicast proxy service nodes to update their private keys.

58. A communication system as recited in claim 57, wherein the second logic comprises logic which when executed is operable to:

distribute the group session key to all member nodes of the plurality of member nodes, wherein the logic operable to distribute the group session key to all member nodes further comprises logic which when executed is operable to create and store the group session key using a particular multicast proxy service node of the plurality of multicast proxy service nodes, wherein the particular multicast proxy service node is associated with a particular domain of the plurality of domains, and wherein the particular domain is associated with the directory;

replicate the directory; and obtain the group session key from a local multicast proxy service node that is a replica of the particular multicast proxy service node.

59. A communication system as recited in claim 57, wherein the second logic comprises logic which when executed is operable to:

associate a plurality of intermediate nodes of the second binary tree with a plurality of multicast service agents;

establish a secure back channel group among the plurality of multicast service agents;

update the group session key to all the multicast service agents in the plurality of multicast service agents by securely communicating the group session key using a secure back channel that is associated with the secure back channel group;

at each intermediate node of the plurality of intermediate nodes, update the group session key of only those leaf nodes that are child nodes of said each intermediate node.

60. A communication system as recited in claim 57, wherein the second logic comprises logic which when executed is operable to:

receive a request for the group session key from a publisher node that is located in a different domain of the plurality of domains from the particular domain in which the second binary tree is stored;

determine an identifier of the publisher node using a first directory service agent that is associated with a particular multicast proxy service node of the plurality of multicast proxy service nodes, wherein the particular multicast proxy service node is in the particular domain;

establish a secure communication channel among the particular multicast proxy service node and a directory service agent that is associated with a different multicast proxy service node of the plurality of multicast proxy service nodes, wherein the different multicast proxy service node is in the different domain.

61. A communication system as recited in claim 44, wherein the second logic comprises logic which when executed is operable to manage removal of a first member node from the multicast group, wherein the logic operable to manage removal of the first member node further comprises logic which when executed is operable to:

create and store the group session key associated with the multicast group and a private key associated with each member node of the plurality of member nodes in a directory;

receive information indicating that the first member node is leaving the multicast group;

update all affected keys of a subset of member nodes of the plurality of member nodes in a branch of the second binary tree that contains the first member node that is leaving;

receive the new group session key for the multicast group, for use after removal of the first member node, and a new private key for a parent node of the first member node, from a local multicast proxy service node of the plurality of multicast proxy service nodes;

communicate a message to the subset of member nodes that causes the subset of member nodes to update their private keys.

62. A communication system as recited in claim 61, wherein the second logic comprises logic which when executed is operable to:

associate a plurality of intermediate nodes of the second binary tree with a plurality of multicast service agents;

establish a secure back channel group among the plurality of multicast service agents;

update the group session key to all the multicast service agents in the plurality of multicast service agents, wherein the logic operable to update the group session key to all the multicast service agents further comprises logic which when executed is operable to securely communicate the group session key using a secure back channel that is associated with the secure back channel group;

at each intermediate node of the plurality of intermediate nodes, update the group session key of only those leaf nodes that are child nodes of said each intermediate node.

63. A communication system as recited in claim 61, wherein the second logic comprises logic which when executed is operable to:

receive a request for the group session key from a publisher node that is located in a different domain of the plurality of domains from the particular domain in which the second binary tree is stored;

determine an identifier of the publisher node using a first directory service agent that is associated with a particular multicast proxy service node of the plurality of multicast proxy service nodes, wherein the particular multicast proxy service node is in the particular domain;

establish a secure communication channel among the particular multicast proxy service node and a directory service agent that is associated with a different multicast proxy service node of the plurality of multicast proxy service nodes, wherein the different multicast proxy service node is in the different domain.

64. A communication system as recited in claim 61, wherein the second logic comprises logic which when executed is operable to:

distribute the group session key to all member nodes of the plurality of member nodes, wherein the logic operable to distribute the group session key to all member nodes further comprises logic which when executed is operable to create and store the group session key using a particular multicast proxy service node of the plurality of multicast proxy service nodes, wherein the particular multicast proxy service node is associated with a particular domain of the plurality of domains, and wherein the particular domain is associated with the directory;

replicate the directory; and obtain the group session key from a local multicast proxy service node that is a replica of the particular multicast proxy service node.

\* \* \* \* \*